US011725067B2

(12) United States Patent
Gibanel et al.

(10) Patent No.: US 11,725,067 B2
(45) Date of Patent: *Aug. 15, 2023

(54) STYRENE-FREE COATING COMPOSITIONS FOR PACKAGING ARTICLES SUCH AS FOOD AND BEVERAGE CONTAINERS

(71) Applicant: SWIMC LLC, Cleveland, OH (US)

(72) Inventors: Sebastien Gibanel, Givry (FR); Benoit Prouvost, Nantes (FR)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/194,953

(22) Filed: Mar. 8, 2021

(65) Prior Publication Data
US 2021/0261696 A1 Aug. 26, 2021

Related U.S. Application Data

(63) Continuation of application No. 16/739,995, filed on Jan. 10, 2020, now Pat. No. 10,968,288, which is a continuation of application No. 15/539,280, filed as application No. PCT/US2015/000236 on Dec. 23, 2015, now Pat. No. 10,538,602.

(60) Provisional application No. 62/096,573, filed on Dec. 24, 2014.

(51) Int. Cl.
C08F 2/24 (2006.01)
C08F 265/06 (2006.01)
C08F 220/20 (2006.01)
C08L 33/08 (2006.01)
C08L 33/10 (2006.01)
C08L 51/06 (2006.01)
C09D 151/00 (2006.01)
C09D 133/08 (2006.01)
C09D 133/12 (2006.01)
C08F 220/32 (2006.01)
C08F 220/18 (2006.01)

(52) U.S. Cl.
CPC .............. C08F 2/24 (2013.01); C08F 220/20 (2013.01); C08F 265/06 (2013.01); C08L 33/08 (2013.01); C08L 33/10 (2013.01); C08L 51/06 (2013.01); C09D 133/08 (2013.01); C09D 133/12 (2013.01); C09D 151/003 (2013.01); C08F 220/1807 (2020.02); C08F 220/325 (2020.02)

(58) Field of Classification Search
CPC ........ C08F 2/24; C08F 220/20; C08F 265/06; C08F 220/30; C08F 2220/325; C09D 151/003; C09D 133/12; C09D 133/08; C08L 33/08; C08L 33/10; C08L 51/06
See application file for complete search history.

(56) References Cited

U.S. PATENT DOCUMENTS

| | | | |
|---|---|---|---|
| 2,967,162 A | 1/1961 | Vasta | |
| 3,248,356 A | 4/1966 | Snyder | |
| 3,297,621 A | 1/1967 | Taft | |
| 3,390,206 A | 6/1968 | Thompson et al. | |
| 3,943,187 A | 3/1976 | Wu | |
| 3,991,216 A | 11/1976 | Christenson et al. | |
| 4,076,676 A | 2/1978 | Sommerfeld | |
| 4,110,291 A | 8/1978 | Barbaras et al. | |
| 4,129,712 A | 12/1978 | Balatan | |
| 4,151,143 A | 4/1979 | Blank et al. | |
| 4,199,622 A | 4/1980 | Kokumai et al. | |
| 4,247,439 A | 1/1981 | Matthews et al. | |
| 4,285,847 A | 8/1981 | Ting | |
| 4,289,674 A | 9/1981 | Christenson et al. | |
| 4,305,859 A | 12/1981 | McEwan et al. | |
| 4,329,401 A | 5/1982 | Talsma et al. | |
| 4,413,015 A | 11/1983 | Anderson et al. | |
| 4,446,258 A | 5/1984 | Chu et al. | |
| 4,487,859 A | 12/1984 | Martino | |
| 4,522,961 A | 6/1985 | Martino et al. | |
| 4,560,714 A | 12/1985 | Gajria et al. | |
| 4,567,246 A | 1/1986 | Gajria et al. | |
| 4,647,612 A | 3/1987 | Ranka et al. | |
| 4,692,491 A | 9/1987 | Ranka et al. | |
| 4,894,397 A | 1/1990 | Morgan et al. | |
| 4,897,810 A | 1/1990 | Nix | |
| 4,898,911 A | 2/1990 | Miyashita et al. | |

(Continued)

FOREIGN PATENT DOCUMENTS

CA 2066988 10/1992
CA 2758205 A1 10/2010

(Continued)

OTHER PUBLICATIONS

"Aerosol® Surfactants—Specialty Additives," Woodland Park, NJ, 12 pages, Cytec Solvay Group, (2015).

(Continued)

Primary Examiner — Robert D Harlan
(74) Attorney, Agent, or Firm — Mueting Raasch Group

(57) ABSTRACT

A method of forming a coating on a food or beverage container, which includes spraying a coating composition onto an interior surface of the food or beverage container, where the coating composition includes an emulsion-polymerized latex copolymer having copolymer chains of one or more ethylenically-unsaturated monomers and one or more styrene offset monomers. Preferably, the coating composition is substantially free of BPA, PVC, and styrene. The method may also include curing the sprayed coating composition, thereby providing the coating on the interior surface of the food or beverage container.

21 Claims, 2 Drawing Sheets

(56) References Cited

U.S. PATENT DOCUMENTS

| | | |
|---|---|---|
| 4,906,684 A | 3/1990 | Say |
| 4,948,834 A | 8/1990 | Baker et al. |
| 4,963,602 A | 10/1990 | Patel |
| 5,043,380 A | 8/1991 | Cole |
| 5,082,742 A | 1/1992 | Padwa |
| 5,157,078 A | 10/1992 | Woo et al. |
| 5,264,469 A | 11/1993 | Mysliwczyk et al. |
| 5,266,628 A | 11/1993 | Essary et al. |
| 5,296,525 A | 3/1994 | Spencer |
| 5,387,625 A | 2/1995 | Parekh et al. |
| 5,527,840 A | 6/1996 | Chutko et al. |
| 5,529,890 A | 6/1996 | McGuckin et al. |
| 5,539,073 A | 7/1996 | Taylor et al. |
| 5,629,376 A | 5/1997 | Sargent et al. |
| 5,686,140 A | 11/1997 | Stoffel |
| 5,714,539 A | 2/1998 | Perez et al. |
| 5,811,484 A | 9/1998 | Wilfinger et al. |
| 5,830,952 A | 11/1998 | Pedersen et al. |
| 5,922,817 A | 7/1999 | Pedersen et al. |
| 5,962,571 A | 10/1999 | Overbeek et al. |
| 6,008,273 A | 12/1999 | Leibelt et al. |
| 6,040,062 A | 3/2000 | McGee et al. |
| 6,197,878 B1 | 3/2001 | Murray et al. |
| 6,388,021 B1 | 5/2002 | Shibata et al. |
| 6,511,756 B1 | 1/2003 | Obuchi et al. |
| 6,852,821 B1 | 2/2005 | Bendix |
| 7,037,584 B2 | 5/2006 | Wind et al. |
| 7,189,787 B2 | 3/2007 | O'Brien et al. |
| 7,303,797 B1 | 12/2007 | Barsotti et al. |
| 7,378,479 B2 | 5/2008 | Tamareselvy et al. |
| 7,592,047 B2 | 9/2009 | O'Brien et al. |
| 7,645,521 B2 | 1/2010 | Wevers et al. |
| 7,682,699 B2 | 3/2010 | Wind et al. |
| 7,858,162 B2 | 12/2010 | Fuhry et al. |
| 7,923,513 B2 | 4/2011 | Killilea et al. |
| 8,092,876 B2 | 1/2012 | O'Brien et al. |
| 8,142,868 B2 | 3/2012 | O"Brien et al. |
| 8,173,265 B2 | 5/2012 | O'Brien et al. |
| 8,367,171 B2 * | 2/2013 | Stenson .......... B65D 1/12 428/35.8 |
| 8,449,960 B2 | 5/2013 | Skillman et al. |
| 8,617,663 B2 | 12/2013 | O'Brien et al. |
| 8,835,012 B2 | 9/2014 | O'Brien et al. |
| 9,029,470 B2 | 5/2015 | Rademacher et al. |
| 9,163,151 B2 | 10/2015 | Lock et al. |
| 9,181,448 B2 | 11/2015 | Li et al. |
| 9,394,456 B2 | 7/2016 | Rademacher et al. |
| 9,242,763 B2 | 8/2016 | Blue et al. |
| 9,404,006 B2 | 8/2016 | Li |
| 9,409,219 B2 | 8/2016 | Niederst et al. |
| 9,415,900 B2 | 8/2016 | O'Brien et al. |
| 9,862,854 B2 | 1/2018 | O'Brien et al. |
| 10,538,602 B2 | 1/2020 | Gibanel et al. |
| 10,800,941 B2 | 10/2020 | Gibanel et al. |
| 10,968,288 B2 | 4/2021 | Gibanel et al. |
| 11,059,989 B2 | 7/2021 | DeSousa et al. |
| 11,332,636 B2 | 5/2022 | Gibanel et al. |
| 2002/0147270 A1 | 10/2002 | Kuo et al. |
| 2002/0155235 A1 | 10/2002 | Taylor et al. |
| 2002/0161108 A1 | 10/2002 | Schultz et al. |
| 2003/0064185 A1 | 4/2003 | Mazza et al. |
| 2003/0144446 A1 | 7/2003 | Lee |
| 2003/0187128 A1 | 10/2003 | Shiba et al. |
| 2004/0259989 A1 | 12/2004 | O'Brien et al. |
| 2005/0196629 A1 | 9/2005 | Bariatinsky et al. |
| 2005/0282957 A1 | 12/2005 | Parker et al. |
| 2006/0100366 A1 | 5/2006 | O'Brien et al. |
| 2007/0017440 A1 | 1/2007 | Tang et al. |
| 2007/0036903 A1 | 2/2007 | Mayr et al. |
| 2007/0117928 A1 | 5/2007 | O'Brien et al. |
| 2007/0281179 A1 | 12/2007 | Ambrose et al. |
| 2008/0299343 A1 | 12/2008 | Vogt et al. |
| 2010/0068433 A1* | 3/2010 | Gibanel .......... B65D 23/0821 428/35.7 |
| 2010/0093913 A1 | 4/2010 | Jones et al. |
| 2010/0224510 A1 | 9/2010 | Ford et al. |
| 2010/0260954 A1 | 10/2010 | Stenson et al. |
| 2011/0195263 A1 | 8/2011 | Malotky et al. |
| 2011/0207850 A1 | 8/2011 | Kan et al. |
| 2011/0290696 A1 | 12/2011 | Stenson et al. |
| 2012/0145721 A1 | 6/2012 | Cavallin |
| 2012/0171470 A1 | 7/2012 | Cavallin et al. |
| 2012/0177855 A1 | 7/2012 | Cavallin et al. |
| 2013/0052381 A1 | 2/2013 | Gallucci et al. |
| 2013/0316109 A1 | 11/2013 | Niederst et al. |
| 2014/0323640 A1 | 10/2014 | Lock et al. |
| 2014/0329954 A1 | 11/2014 | Craun et al. |
| 2015/0017359 A1 | 1/2015 | Singer et al. |
| 2015/0218407 A1 | 8/2015 | Bao et al. |
| 2015/0225600 A1 | 8/2015 | Cunningham et al. |
| 2016/0009941 A1 | 1/2016 | Rademacher |
| 2016/0122581 A1 | 5/2016 | You et al. |
| 2016/0376446 A1 | 12/2016 | Gibanel et al. |
| 2017/0002227 A1 | 1/2017 | Gibanel et al. |
| 2017/0009111 A1 | 1/2017 | Bauer et al. |
| 2017/0369603 A1 | 12/2017 | Gibanel et al. |
| 2018/0265729 A1 | 9/2018 | Gibanel et al. |
| 2019/0002724 A1 | 1/2019 | DeSousa et al. |
| 2019/0249029 A1 | 8/2019 | Gibanel et al. |
| 2020/0056066 A1 | 2/2020 | Gibanel et al. |
| 2020/0148795 A1 | 5/2020 | Gibanel et al. |
| 2020/0148908 A1 | 5/2020 | DeSousa et al. |
| 2020/0231837 A1* | 7/2020 | Gibanel .......... B05D 7/14 |
| 2020/0385601 A1 | 12/2020 | Gibanel et al. |
| 2020/0392366 A1 | 12/2020 | Gibanel et al. |
| 2022/0315789 A1 | 10/2022 | Gibanel et al. |

FOREIGN PATENT DOCUMENTS

| | | |
|---|---|---|
| CN | 1636043 A | 7/2005 |
| CN | 1703432 A | 11/2005 |
| CN | 102712722 A | 10/2012 |
| CN | 102906144 A | 1/2013 |
| CN | 103282450 A | 9/2013 |
| CN | 107690456 A | 5/2016 |
| CN | 106164113 A | 11/2016 |
| CN | 107683311 A | 2/2018 |
| DE | 10225367 | 9/2003 |
| EP | 0114478 A1 | 8/1984 |
| EP | 0705852 A1 | 4/1996 |
| EP | 0 838 537 A1 | 4/1998 |
| EP | 1371689 | 12/2003 |
| EP | 1049748 B1 | 1/2007 |
| EP | 1908798 | 4/2008 |
| EP | 2009034 | 12/2008 |
| EP | 2033992 | 3/2009 |
| EP | 3529310 B1 | 12/2021 |
| GB | 1100569 | 1/1968 |
| GB | 1555868 | 11/1979 |
| GB | 1574721 | 9/1980 |
| GB | 2 287 469 A | 9/1995 |
| JP | S5216490 B2 | 5/1977 |
| JP | 5339387 | 4/1978 |
| JP | 58185604 | 10/1983 |
| JP | 2-232219 | 9/1990 |
| JP | H0543830 | 2/1993 |
| JP | H07-228834 A | 8/1995 |
| JP | H09-025436 A | 1/1997 |
| JP | 2000080212 | 3/2000 |
| JP | 2002138245 | 5/2002 |
| JP | 2002155234 | 5/2002 |
| JP | 2004250505 | 9/2004 |
| JP | 4683515 B2 | 5/2011 |
| KR | 960010816 A | 4/1996 |
| RU | 2076109 | 3/1997 |
| RU | 2133756 | 7/1999 |
| SU | 653266 | 3/1979 |
| WO | WO 89/12618 A1 | 12/1989 |
| WO | WO 9426789 | 11/1994 |
| WO | WO 97/23516 A1 | 7/1997 |
| WO | WO 99/20676 A1 | 4/1999 |
| WO | WO 00/12625 A1 | 3/2000 |
| WO | WO 0049072 | 8/2000 |
| WO | WO 0123471 | 4/2001 |

(56) References Cited

FOREIGN PATENT DOCUMENTS

| | | |
|---|---|---|
| WO | WO 02/064691 | 8/2002 |
| WO | WO 03/010254 A2 | 2/2003 |
| WO | WO 2004/090020 | 10/2004 |
| WO | WO 2005/080517 | 9/2005 |
| WO | WO 2006/045017 | 4/2006 |
| WO | WO 2007/123659 | 11/2007 |
| WO | WO 2007/138111 | 12/2007 |
| WO | WO 2008/036629 | 3/2008 |
| WO | WO 2009/137014 | 11/2009 |
| WO | WO 2010/019180 | 2/2010 |
| WO | WO 2010/062844 | 6/2010 |
| WO | WO 2010/068433 A1 | 6/2010 |
| WO | WO 2010/097353 | 9/2010 |
| WO | WO 2010/100121 | 9/2010 |
| WO | WO 2010/100122 | 9/2010 |
| WO | WO 2010/114648 | 10/2010 |
| WO | WO 2010/118356 | 10/2010 |
| WO | WO 2010/125032 A1 | 11/2010 |
| WO | WO 2011/009024 | 1/2011 |
| WO | WO 2011/011705 | 1/2011 |
| WO | WO 2011/011707 | 1/2011 |
| WO | WO 2011/057781 A2 | 5/2011 |
| WO | WO 2011/068930 | 6/2011 |
| WO | WO 2011/149449 A1 | 12/2011 |
| WO | WO 2012/089746 | 7/2012 |
| WO | WO 2012/089747 | 7/2012 |
| WO | WO 2012/108874 A1 | 8/2012 |
| WO | WO 2013/098218 A1 | 7/2013 |
| WO | WO 2013/191826 A1 | 12/2013 |
| WO | WO 2014/089410 | 6/2014 |
| WO | WO 2014/139971 | 9/2014 |
| WO | WO 2014/139973 A1 | 9/2014 |
| WO | WO 2014/140057 | 9/2014 |
| WO | WO 2014/186285 | 11/2014 |
| WO | WO 2015/002958 | 1/2015 |
| WO | WO 2015/002961 | 1/2015 |
| WO | WO 2016/105502 | 6/2016 |
| WO | WO 2016/105504 | 6/2016 |
| WO | WO 2016/196174 | 12/2016 |
| WO | WO 2016/196190 | 12/2016 |
| WO | WO 2017/112837 | 6/2017 |
| WO | WO 2017/180895 | 10/2017 |
| WO | WO 2018/013766 | 1/2018 |
| WO | WO 2018/075762 | 4/2018 |
| WO | WO 2018/085052 | 5/2018 |
| WO | WO 2019/006444 | 1/2019 |
| WO | WO 2019/046700 | 3/2019 |
| WO | WO 2019/046750 | 3/2019 |
| WO | WO 2019/241209 | 12/2019 |
| WO | WO 2022/147004 A1 | 7/2022 |

OTHER PUBLICATIONS

Australian Examination Report No. 1 for Application No. 2015371311, dated Jul. 24, 2019.
Diehl et al., "Waterborne Mechanical Dispersions of Polyolefins", The Dow Chemical Company, Jan. 24, 2009, pp. 1-14.
"Empimin OP 70," Socium Di-Octyl Suplhosuccinate, 3 pages, Huntsman, Saint-Mihiel, France, (2006).
English language translation for Japanese Laid-open Publication No. 5339387 (publication date Apr. 11, 1978). 19 pages.
English translation of Chinese OA dated Feb. 7, 2013 for Chinese Application No. CN201080008007.8, 8 pages.
European Patent Application No. 15 87 3784.1, filed Dec. 23, 2015, Extended European Search Report, dated Jul. 19, 2018, 7 pages.
European Patent Application No. 16 88 0072.0, filed Jul. 23, 2018, Supplementary European Search Report, dated Sep. 17, 2019, 6 pages.
European Search Report for EP Application No. 15873785.8, dated May 11, 2018.
Glycosperse® L-20, Polysorbate 20, Poe (20) Sorbitan Monolaurate. CAS No. 68154-33-6, 2 pages, Lonza, (2010).
Glycosperse™ L-20 KFG, Polysorbate 20, Poe (Sorbitan Monolaurate), CAS No. 9005-64-5, 2 pages, Lonza, (2013).
International Search Report and Written Opinion for International Application No. PCT/EP2010/052174 dated Jun. 15, 2010, 13 pages.
International Search Report for International Application No. PCT/US2015/000236 dated Apr. 10, 2016.
International Search Report for International Application No. PCT/US2015/000238 dated May 16, 2016, 5 pages.
International Search Report for International Application No. PCT/US2016/068180 dated Mar. 21, 2017, 3 pages.
International Search Report for International Application No. PCT/US2017/041858 dated Oct. 10, 2017, 4 pages.
International Search Report for International Application No. PCT/US2018/0040546 dated Sep. 19, 2018 21, 2018, 3 pages.
International Preliminary Report on Patentability dated May 30, 2011 for International Application No. PCT/EP2010/052174, 7 pages.
International Preliminary Report on Patentability for International Application No. PCT/US2015/000236 dated Jun. 27, 2017.
International Preliminary Report on Patentability for International Application No. PCT/US2015/000238 dated Jul. 6, 2017, 7 pages.
International Preliminary Report on Patentability for International Application No. PCT/US2016/068180 dated Jun. 26, 2018, 8 pages.
International Preliminary Report on Patentability for International Application No. PCT/US2017/041858 dated Jan. 15, 2019, 7 pages.
Men'Shikova et al., "Synthesis of Carbonxylated Monodisperse Latexes and Their Self-Organization in Thin Films," Russian J. of Applied Chem., vol. 78, No. 1 (2005), pp. 159-165.
Mishra et al., "Synthesis and characterization of butyl acrylate/ methyl methacrylate/glycidyl methacrylate latexes," J. of Applied Polymer Science, vol. 115 (2010), pp. 549-557. Abstract provided.
Norakankorn et al., "Synthesis of core/shell structure of glycidyl-functionalized poly(methylmethacrylate) latex nanoparticles Via a differential microemulsion polymerization," European Polymer J., 45 (2009), pp. 2977-2986. Abstract provided.
Polymerizable Surfactants, Montello Inc., retrieved on Feb. 4, 2015 http://www.montelloinc.com/polymerizable_surfactants2.htm, 3 pages.
Polystep® B-1, Stepan Company retrieved from http://www.stepan.com/products/Surfactants/POLYSTEP%C2%AE/POLYSTEP%C2%AE-B-1.aspx, © 2012, 4 pages.
"Specialty Additives Aerosol® Surfactants," 12 pages, Oct. 2013, Cytec.
Stepan, Emulsion Polymerization, Product Bulletin, Nov. 2009, 2 pages.
Thailand Office Action for Thailand Patent Application No. 1701003636 dated Oct. 31, 2017, 3 pages.
Wang et al., "Mechanism of Emulsion Polymerization of Styrene Using a Reactive Surfactant," Journal of Polymer Science Part A: Polymer Chemistry, vol. 39, Issue 18, 3 pages, Wiley Online Library, Sep. 15, 2001.
Basf Group, "Dihydrodicyclopentadienyl Acrylate (DCPA)" Technical Information TI/CP 1424 e, Petrochemicals Specialty Monomers, Jun. 2016, 2 pages.
Calbo, Ed., Translated by Zhu et al.; "Handbook of Coatings Additives", Shanghai Scientific and Technological Literature Publishing House, May 31, 2000, Cover, title page, publishing information, preface, table of contents, pp. 176-179. Translation provided of relevant text from p. 177.
Chinese Patent Application No. 201880053457.5, Search Report from First Office Action dated Dec. 13, 2021, 5 pages including English translation.
European Patent 3529310 granted Dec. 8, 2021 (Application No. Ep 17867591.4 filed Oct. 19, 2017), Notice of Opposition to a European patent filed Sep. 5, 2022, Opponent: Akzo Nobel Coatings International B.V., 14 pages.
European Patent 3529310 granted Dec. 8, 2021 (Application No. Ep 17867591.4 filed Oct. 19, 2017), Notice of Opposition to a European patent filed Sep. 8, 2022, Opponent: PPG Industries, Inc., 37 pages.
European Patent 3529310 granted Dec. 8, 2021 (Application No. Ep 17867591.4 filed Oct. 19, 2017), Consolidated List of References during Opposition, issued Feb. 1, 2023, 1 page.

(56) References Cited

OTHER PUBLICATIONS

Extended European Search Report, Supplementary European Search Report and Search Opinion, dated Mar. 2, 2021, for EP Application No. 18823016.3, 7 pages.
Fendler and Dékány, Eds., "Nanoparticles in Solids and Solutions," NATO ASI Series, Kluwer Academic Publishers, 1996, Cover p., title page, copyright page, and pp. 265-266.
Good, "Chapter 17: Recent Advances in Metal Can Interior Coatings", 1988, *Food and Packaging Interactions*; Hotchkiss, ed., ACS Symposium Series, American Chemical Society, Washington D.C., 14 pages.
Gu, "The Quality of the Film and Treatments of Inside Spray Coating for Food Can" Dec. 30, 2012, Packaging and Food Machinery, 30(6):67-70. With English Abstract. Translation of Chinese Search Report provided for relevance.
"Guidance for Industry: Preparation of Premarket Submissions for Food Contact Substances (Chemistry Recommendations)," Office of Food Additive and Safety, Food and Drug Administration, FDA Docket No. FDA-2013-S-0610, Dec. 2007. Online [retrieved Nov. 9, 2020]. Retrieved from the Internet :<URL:https://www.regulations.gov/docket?D=FDA-2013-S-0610>; 23 pgs.
Howard et al., "Dictionary of Chemical Names and Synonyms", Lewis Publishers, © 1992, 3 pages.
International Standard ATM D1200-88, (1988), "Standard Test Method for Viscosity by Ford Viscosity Cup," 3 pages.
International Standard ASTM D1957-86 (Reapproved 2001), "Standard Test Method for Hydroxyl Value of Fatty Oils and Acids," 3 pages.
International Standard ASTM D 3359-17, (2017), "Standard Test Methods for Rating Adhesion by Tape Test," 9 pages.
International Preliminary Report on Patentability for International Application No. PCT/US2018/040546 dated Dec. 31, 2019, 6 pages.
Larrañaga, et al., "Hawley's Condensed Chemical Dictionary, Sixteenth Edition", 2016, John Wiley & Sons, Inc., Hoboken, New Jersey, Title pages, copyright page, table of contents, p. 814, and information page.
Lawson, "Waterborne Spray Can Coatings", 1978, *Modern Container Coatings*, Strand, ed., ACS Symposium Series, American Chemical Society, Washington D.C., 3 pages.
Levy, et al., *The Organic Chemistry of Sugars*, 2006, Taylor & Francis Group, CRC Press, Title page, copyright page, pp. 227-231.
Office Action and Search Report dated Mar. 27, 2019 for Chinese Patent Application No. 201580070922.2, with English translation; 17 pages.
Office Action and Search Report dated Sep. 26, 2019 for Indian Patent Application No. 20177022748; 8 pages.
Product Guide, "Liquid Coating Resins, Asia Pacific", 2006, Cytec Surfaces Specialties, Inc., 15 pages.
Product Information Bulletin, "Can coatings based on Epikote resins", Sep. 1991, Shell Chemicals, 2 pages.
Product Information Sheet, "Phenolic Crosslinkers Product Guide - Phenodur® Resins—Worldwide", 2017, allnex GMBH, Frankfurt am Main, Germany, 7 pages.
Sigma-Aldrich, "Diocyl sulfosuccinate sodium salt," Jan. 15, 2019, 4 pages. https://www.sigmaaldrich.com/catalog/product/aldrich/323586?lang=en&region=US.
Stanssens, et al., "On the mechanism of the esterification of a β-hydroxy alkylamide with a carboxylic acid", 1993, *Progress in Organic Coatings*, 22:379-391.
U.S. National Library of Medicine, Agent Name Docusate sodium, CAS No. 577-11-7. Formula C20—H38—O7—S.Na. 2 pages. Oct. 2018.
White paper, "Overview of Glass Transition Analysis by Differential Scanning Calorimetry (TA443)", TA Instruments. No publication date available, received on Sep. 8, 2022.
"D1a—Calculations for Selected Examples of D1", Other Evidence, Notice of opposition to a European patent, filed May 30, 2023 in European Patent 3741818, 1 page.
"E1—Viscosity Conversion Table", Other Evidence, Notice of opposition to a European patent, filed May 30, 2023 in European Patent 3741818, 1 page.
European Patent 3741818 granted Aug. 31, 2022 (Application No. EP 20178787.6 filed Jun. 8, 2020), Notice of opposition to a European patent, filed May 30, 2023, Opponent: PPG Industries, Inc., 47 pages.

\* cited by examiner

STYRENE-FREE COATING COMPOSITIONS FOR PACKAGING ARTICLES SUCH AS FOOD AND BEVERAGE CONTAINERS

CROSS REFERENCE TO RELATED APPLICATION(S)

This application is a continuation of U.S. application Ser. No. 16/739,995, filed Jan. 10, 2020, which is a continuation of U.S. application Ser. No. 15/539,280, filed Jun. 23, 2017, now U.S. Pat. No. 10,538,602, which is a National Stage Entry of PCT/US2015/000236, filed Dec. 23, 2015, which claims benefit to U.S. Provisional Application No. 62/096,573, filed Dec. 24, 2014, each of which is fully incorporated herein in its entirety by reference.

FIELD

The present disclosure is directed to coating compositions. In particular, the present disclosure is directed to latex emulsion coating compositions, such as for forming coatings (e.g., spray coatings) for food and beverage containers, as well as other packaging articles.

BACKGROUND

A wide variety of coatings have been used to coat the surfaces of packaging articles (e.g., food and beverage cans). For example, metal cans are sometimes coated using "coil coating" or "sheet coating" operations, i.e., a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed or partially formed article and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, have sufficient flexibility to withstand deflection of the underlying substrate without rupturing (e.g., during fabrication steps and/or damage occurring during transport or use of the packaging article), and resist degradation over long periods of time, even when exposed to harsh environments.

Many current packaging coatings contain mobile or bound bisphenol A ("BPA") or aromatic glycidyl ether compounds, polyvinyl chloride ("PVC"), or styrene. Although the balance of scientific evidence available to date indicates that the small trace amounts of these compounds that might be released from existing coatings does not pose any health risks to humans, these compounds are nevertheless perceived by some people as being potentially harmful to human health. From the foregoing, it will be appreciated that what is needed in the art is a packaging container (e.g., a food or beverage can or a portion thereof) that is coated with a composition that does not contain extractible quantities of such compounds.

SUMMARY

An aspect of the present disclosure is directed to a method of forming a coating on a packaging article, such as a food or beverage container. The method includes applying a coating composition using any suitable technique to a substrate (typically a metal substrate) prior to or after forming the substrate into a food or beverage container or a portion thereof. The coating composition may be used to form either an exterior coating or an interior coating.

In a preferred embodiment, the coating composition is spray applied onto an interior surface of a food or beverage container. The coating composition includes an emulsion-polymerized latex copolymer dispersed in an aqueous carrier, where the latex copolymer is preferably a reaction product of monomers that include one or more ethylenically-unsaturated monomers and one or more styrene offset monomers, where, in preferred embodiments, the monomers used to produce the latex copolymer are substantially free of BPA, PVC and other halogenated monomers, and styrene. In some further preferred embodiments, the monomers used to produce the latex copolymer are substantially free of oxirane groups.

The styrene offset monomers preferably include (i) an ethylenically-unsaturated monomer having a polycyclic group, (ii) an ethylenically-unsaturated monomer having a monocyclic group with a ring structure having 3-5 atoms in the ring, or (iii) combinations thereof, where a combined concentration of (i) and (ii) preferably constitutes at least about 10% by weight of the monomers used to produce the emulsion-polymerized latex copolymer. In some embodiments, the styrene offset monomers include one or more of the above monomers (i) and (ii) in combination with an ethylenically-unsaturated monomer, other than styrene, having a monocyclic group with 6 or more atoms in the ring (e.g., benzyl (meth)acrylate and/or cyclohexyl (meth)acrylate).

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "about" is used herein with respect to measurable values and ranges due to expected variations known to those skilled in the art (e.g., limitations and variabilities in measurements).

The term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

The term "aryl group" (e.g., an arylene group) refers to a closed aromatic ring or ring system such as phenylene, naphthylene, biphenylene, fluorenylene, and indenyl, as well as heteroarylene groups (i.e., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.).

The term "ethylenically-unsaturated group" refers to a carbon-carbon double or triple bond capable of participating in a free-radical initiated emulsion polymerization reaction, and is not intended to encompass the carbon-carbon double bonds present in aryl groups such as, for example, the phenyl group of styrene.

The term "cyclic group" means a closed ring organic group that is classified as an alicyclic group or an aromatic group, both of which can include heteroatoms.

The term "alicyclic group" means a cyclic organic group having properties resembling those of aliphatic groups.

The term "polycyclic" when used in the context of a group refers to an organic group that includes at least two cyclic groups in which one or more atoms (and more typically two or more atoms) are present in the rings of both of the at least two cyclic groups. Thus, for example, a group that consists of two cyclohexane groups connected by a single methylene group is not a polycyclic group.

The term "tricyclic" group refers to a polycyclic group that includes three cyclic groups in which the ring of each cyclic group shares one or more atoms with one or both of the rings of the other cyclic groups.

A group that may be the same or different is referred to as being "independently" something.

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The terms "a", "an", "the", "at least one," and "one or more" are used interchangeably. Thus, for example, reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyester is interpreted to include one or more polymer molecules of the polyester, where the polymer molecules may or may not be identical (e.g., different molecular weights, isomers, etc. . . . ).

The term "substantially free" of a particular compound means that the compositions of the present disclosure contain less than 100 parts per million (ppm) of the recited compound. The term "essentially free" of a particular compound means that the compositions of the present disclosure contain less than 10 ppm of the recited compound. The term "essentially completely free" of a particular compound means that the compositions of the present disclosure contain less than 1 ppm of the recited compound. The term "completely free" of a particular compound means that the compositions of the present disclosure contain less than 20 parts per billion (ppb) of the recited compound.

The term "food-contact surface" refers to the substrate surface of a container (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a polymeric coating composition.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

The term "polymer" includes both homopolymers and copolymers (e.g., polymers of two or more different monomers). Similarly, unless otherwise indicated, the use of a term designating a polymer class such as, for example, "acrylic" is intended to include both homopolymers and copolymers (e.g., polyester-acrylic copolymers).

The term "monomer" includes any reactant molecule used to produce a polymer, and encompasses both single-unit molecules (e.g., an acrylic molecule) and multi-unit molecules (e.g., an acrylic oligomer).

The terms "comprises" and variations thereof do not have a limiting meaning where these terms appear in the description and claims.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Figure 1:
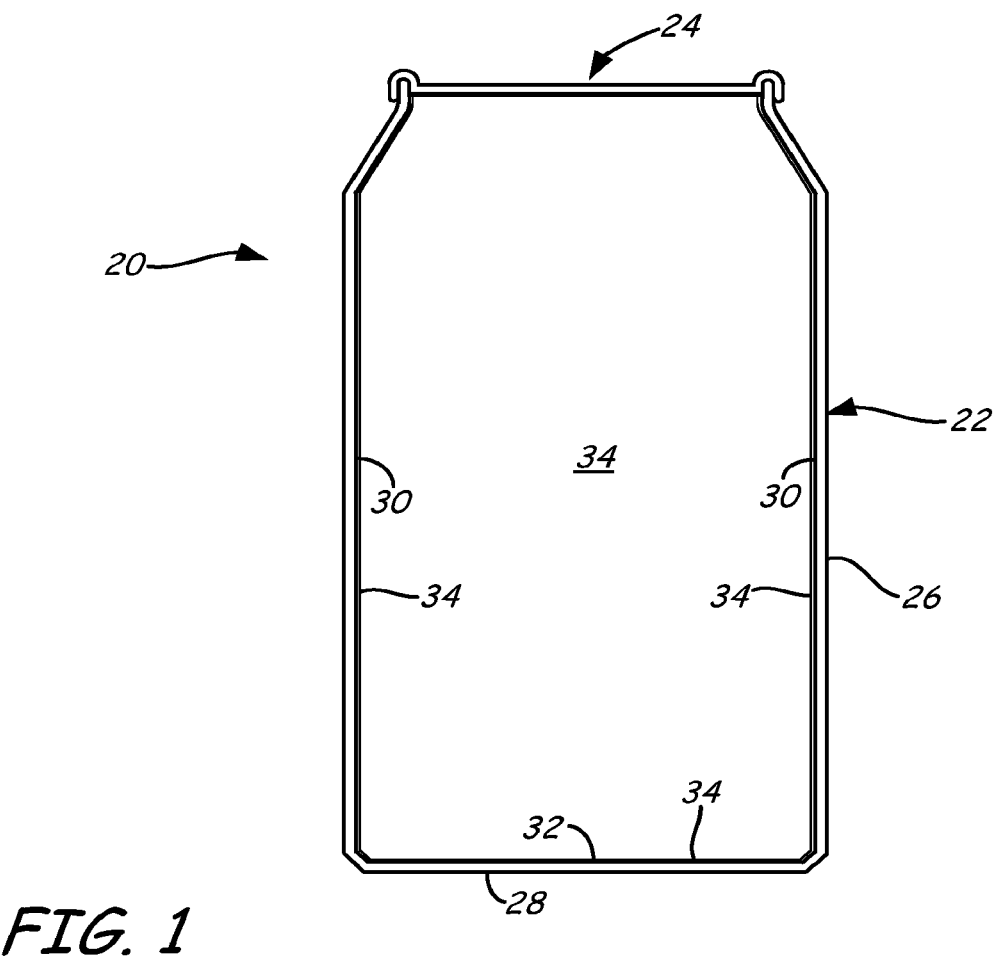
FIG. 1 is a schematic illustration of a two-piece food or beverage container having a coating formed from the coating composition of the present disclosure.

The present disclosure is directed to a coating composition formulated from a latex emulsion that, in preferred embodiments, is substantially free or completely free of BPA, PVC and halogenated monomers, and styrene, and has a suitable glass transition temperature (e.g., greater than about 40° C.) for reduced flavor scalping. As discussed below, the latex emulsion is preferably produced from monomers that include one or more "styrene-offset" monomers, which preferably contribute to higher glass transition temperatures and chemical resistance, and also preferably adhesion to metal substrates. As such, the coating composition is particularly suitable for use in interior food-contact coating applications, including spray coating applications to coat interior surfaces of containers, including portions thereof, such as for use in packaging food and beverage products.

The latex emulsion of the coating composition may include an aqueous carrier and particles of a latex copolymer that is polymerized in one or more emulsion polymerization steps. The latex emulsion may optionally be further formulated and/or modified, such as, for example, for inside-spray coating applications. The resulting coating composition may then be spray applied on an interior metal surface of a formed or partially-formed container (e.g., a food or beverage container). The applied coating composition may then be cured on the interior metal surface to produce a protective interior coating. Alternatively, the coating composition may be applied on an interior or exterior surface using any suitable coating technique (e.g., roll coating, wash coating, dip coating, etc.) prior to or after forming the substrate to be coated into a food or beverage container or a portion thereof.

During the emulsion polymerization to produce the latex copolymer, reactant monomers, may be dispersed or otherwise suspended in an aqueous carrier, optionally with the use of one or more external surfactants. The reactant monomers may include a mixture of compounds capable of polymerizing under free radical-initiated, emulsion polymerization conditions, such as monomers having ethylenically-unsaturated groups.

The reactant monomers preferably include one or more ethylenically-unsaturated monomers, where at least a portion of the ethylenically-unsaturated monomers are styrene-offset monomers. As used herein, "the total weight of the reactant monomers" refers to the total weight of all monomers that are polymerized to produce the latex copolymer with covalent bonds.

The ethylenically-unsaturated monomers may each include one or more ethylenically-unsaturated groups. This allows the monomers to polymerize with each other to form copolymer chains, which may be linear and/or branched. Additionally, in some embodiments, a portion of the ethylenically-unsaturated monomers preferably have two or more ethylenically-unsaturated groups. These monomers may react to form interconnecting linkages between the copolymer chains (or as growth sites for the copolymer chains), thereby crosslinking the copolymer chains. The collection of optional cross-linked polymer chains produce the latex copolymer, which can be provided as a copolymer particle dispersed in the aqueous carrier.

Examples of suitable compounds for the ethylenically-unsaturated monomers include the styrene-offset monomers, (meth)acrylate monomers, ethylenically-unsaturated acid-functional monomers, polymerizable surfactants, oligomers thereof, and mixtures thereof.

The styrene-offset monomers may include any ethylenically-unsaturated cyclic monomer that preferably contribute to higher glass transition temperatures, chemical resistance, and/or adhesion to metal substrates. Suitable ethylenically-unsaturated cyclic monomers include non-styrenic monomers having cyclic groups and ethylenically-unsaturated groups (e.g., cyclic vinyl monomers), such as one or more ethylenically-unsaturated aromatic monomers, ethylenically-unsaturated alicyclic monomers, and mixtures thereof.

Illustrative ethylenically-unsaturated cyclic monomers include those respectively having the following structure:

(Formula 1)

where group $R_1$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_1$. Group $R_2$ may be any suitable organic group, such as, for example, a $C_1$-$C_{16}$ alkyl or alkenyl group, which can be substituted with one or more (e.g., 1-3) groups such as hydroxy group, halogen groups, oxirane groups, and alkoxy groups, for example.

Group X may be a —COO— ester group, another step-growth linkage group, a hydrocarbyl group, a combination thereof, or may be omitted. In preferred embodiments, the ethylenically-unsaturated cyclic monomers are free of oxirane groups or halogen groups, and more preferably both. The integer "n" may be zero or one, where, when "n" is zero, group $R_2$ is omitted and the —X-$G_{Cyclic}$ group extends directly from the unsaturated group. In some preferred embodiments, when group $G_{Cyclic}$ is an aromatic ring, Group X is a —COO— ester group and/or "n" is one, such that the aromatic ring does not directly extend from the ethylenically-unsaturated group. In further preferred embodiments, the unsaturated bond (e.g., double bond) is connected to a terminal carbon of the molecule (e.g., a $CH_2$ group), as shown in Formula 1.

Group $G_{Cyclic}$ may be any suitable group having one or more cyclic groups, where at least a portion of the cyclic groups preferably do not react during polymerization such that the cyclic group(s) remain as a pendant and/or terminal group of the copolymer chain. For example, Group $G_{Cyclic}$ may include one or more $C_3$-$C_{10}$ ring structures, where one or more of the carbon atoms in the ring structures may be substituted with other atoms, such as oxygen, nitrogen, nitrogen, silicon, sulfur, phosphorus, and the like. Furthermore, group $G_{Cyclic}$ may also include one or more additional groups that may extend from one or more atoms of the ring structures(s), such as one or more organic groups (e.g., $C_1$-$C_{16}$ alkyl or alkenyl groups), hydroxy groups, halogen groups, oxirane groups, and alkoxy groups, for example.

In some embodiments, Group $G_{Cyclic}$ may include a monocyclic aromatic or alicyclic structure. In these embodiments, group $G_{Cyclic}$ more preferably includes a monocyclic alicyclic structure having $C_3$-$C_{10}$ ring structures, where at least a portion of the styrene-offset monomers (e.g., >1%, >5%, >10%, >20%, >30%, >40%, >50%, >75%, >90%, >95%, etc.) preferably having $C_3$, $C_4$, or $C_5$ ring structures, or with substituted atoms.

Examples of suitable monomers having monocyclic alicyclic structures may include tetrahydrofurfuryl (meth)acrylate, furfuryl (meth)acrylate, cyclopropyl (meth)acrylate, cyclobutyl (meth)acrylate, cyclopentyl (meth)acrylate, cyclohexyl (meth)acrylate, substituted variants thereof (e.g., substitution of one or more hydrogen atoms, and especially hydrogen atom(s) attached to the alicyclic ring) and the like. Examples of suitable monomers having monocyclic aromatic structures may include benzyl (meth)acrylate, benzyl 2-ethyl acrylate, 2-(4-Benzoyl-3-hydroxyphenoxy)ethyl acrylate, vinyl toluene, benzyl 2-propylacrylate, substituted variants thereof, and the like.

In other embodiments, Group $G_{Cyclic}$ may include a polycyclic group, which preferably includes two or more alicyclic and/or aromatic rings, such as bicyclic groups, tricyclic groups, tetracyclic groups, and the like, where adjacent rings may have fused, bridged, and/or spiro arrangements. In these embodiments, each ring structure more preferably includes a $C_3$-$C_{10}$ ring structure, where adjacent rings preferably contain at least one common atom. In some further embodiments, adjacent rings of the polycyclic group contain at least two common atoms (e.g., for fused and bridged rings). In some additional embodiments, adjacent rings of the polycyclic group contain at least three common atoms (e.g., for bridged rings). In certain preferred embodiments, the polycyclic group includes two or more 5-atom rings, two or more 6-atom rings, or at least one 5-atom ring and at least one 6-atom ring.

Specific examples of suitable polycyclic monomers for the styrene-offset monomers may include isobornyl (meth)acrylate, norbornane (meth)acrylate, norbornene (meth)acrylate, norbornadiene, tricyclodecenyl (meth)acrylate, isosorbide (meth)acrylate, tricyclodecane (meth)acrylate, bicyclo[4.4.0]decane (meth)acrylate, vinyl variations thereof, and mixtures thereof.

In some embodiments, one or more polycyclic groups are derived from plant based materials such as, for example corn. Examples of suitable plant-based materials include compounds derived from sugars, with anhydrosugars being preferred, and dianhydrosugars being especially preferred. Examples of suitable such compounds include bisanhydrodexitol or isohexide compounds, such as isosorbide, isomannide, isoidide, derivatives thereof, and mixtures thereof.

In some embodiments, the one or more polycyclic groups are unsaturated bicyclic groups represented by the IUPAC (International Union of Pure and Applied Chemistry) nomenclature of Formula 2 below:

bicyclo[x.y.z]alkene (Formula 2)

where "x" is an integer having a value of 2 or more, "y" is an integer having a value of 1 or more, "z" is an integer having a value of 0 or more, and the term alkene refers to the IUPAC nomenclature designation (e.g., hexene, heptene, heptadiene, octene, etc.) for a given bicyclic molecule and denotes that that the bicyclic group includes one or more double bonds (more typically one or more carbon-carbon double bonds).

In some embodiments, "z" in Formula 2 is one or more. In other words, in certain embodiments, the bicyclic groups are bridged bicyclic groups. By way of example, bicyclo[4.4.0]decane is not a bridged bicyclic. In some embodiments, "x" has a value of 2 or 3 (more preferably 2) and each of "y" and "z" independently have a value of 1 or 2. The bicyclic structures represented by Formula 2 include one or more carbon-carbon double bonds (e.g., 1, 2, 3, etc.).

Non-limiting examples of some suitable unsaturated bicyclic groups represented by Formula 2 include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. It is also contemplated that the bicyclic groups represented by Formula 2 may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic group) or acyclic groups may be attached to the bicyclic group represented by Formula 1. Thus, for example, in some embodiments the bicyclic group of Formula 1 may be present in a tricyclic or higher group.

In some embodiments, some or all of the bicyclic groups may be saturated. Non-limiting examples of saturated bicyclics include saturated homologs of the structures represented by Formula 2 (i.e., bicyclo[x.y.z]alkane, with x, y, and z as previously described) such as, for example, bicyclo[2.1.1]hexane, bicyclo[2.2.1]heptane, bicyclo[2.2.2]octane, and bicyclo[3.2.1]octane, bicyclo[4.3.2]undecane, bicyclo[5.2.0]nonane. In one embodiment, the bicyclic group includes two saturated spiro, fused, and/or bridged rings and further includes one or more unsaturated and/or aromatic organic groups attached to one of the saturated rings.

The styrene-offset monomers may constitute greater than about 5%, more preferably greater than about 10%, even more preferably greater than about 20%, and even more preferably greater than about 30% by weight of the latex copolymer, based on the total weight of the reactant monomers. The styrene-offset monomers may also constitute less than about 90%, more preferably less than about 70%, even more preferably less than about 60%, and even more preferably less than about 50% by weight of the latex copolymer, based on the total weight of the reactant monomers. Typically, a majority (>50 wt-%), a substantial majority (e.g., >70 wt-%, >80 wt-%, >90 wt-%, etc.), or substantially all (e.g., >95 wt-%, >99 wt-%, etc.) of the styrene-offset monomers are cyclic-group containing monomers.

In preferred embodiments, a significant portion, or even all, of the styrene-offset monomers (e.g., >5%, >10%, >20%, >30%, >40%, >50%, >75%, >90%, >95%, etc.) is obtained from (i) the polycyclic monomers and/or (ii) the monocyclic monomers having ring structures with 3-5 atoms (e.g., $C_3$, $C_4$, or $C_5$ ring structures, or with substituted atoms) (collectively referred to as the "preferred styrene-offset monomers". For example, the preferred styrene-offset monomers may constitute at least about 10%, more preferably greater than about 20%, and even more preferably greater than about 30% by weight of the latex copolymer, based on the total weight of the reactant monomers.

In some embodiments, at least some of the styrene-offset monomers may be non-cyclic monomers that preferably contribute to a film having a relatively "high" glass transition temperature. Examples of such monomers may include ethylenically unsaturated monomers having homopolymers with glass transition temperatures >50° C., >60° C., >70° C., >80° C., or >90° C. Specific examples may include acrylonitrile (97° C.), acrylic acid (106° C.), methacrylic acid (228° C.), methyl methacrylate (105° C.), ethyl methacrylate (65° C.), isobutyl methacrylate (53° C.), 2 hydroxy ethyl methacrylate (55° C.), 2 hydroxy propyl methacrylate (55° C.), and acrylamide (165° C.), wherein a glass transition temperature for a homopolymer of each monomer as recited in H. Coyard et al., Resins for Surface Coatings: Acrylics & Epoxies 40-41 (PKT Oldring, ed.), Vol. 1 (2nd ed. 2001) is reported in parentheses. Methyl methacrylate is a preferred such monomer.

Suitable non-cyclic (meth)acrylate monomers for use in the latex copolymer include those having the following structure:

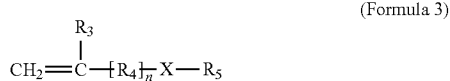

(Formula 3)

where group $R_3$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_3$. Groups $R_4$ and $R_5$ may each independently be any suitable organic group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example.

Group X in Formula 3 is a —COO— ester group. In preferred embodiments, the mono-unsaturated monomers are free of oxirane groups or halogen groups, and more preferably both. The integer "n" may be zero or one, more preferably zero such that group $R_4$ is omitted and the —X—$R_5$ group extends directly from the unsaturated group. In further preferred embodiments, the unsaturated bond (e.g., double bond) is connected to a terminal carbon of the molecule (e.g., a $CH_2$ group), as shown in Formula 3.

Specific examples of suitable non-cyclic (meth)acrylates encompass alkyl (meth)acrylates, which are preferably esters of acrylic or methacrylic acid. Examples of suitable alkyl (meth)acrylates include methyl (meth)acrylate, ethyl (meth)acrylate, propyl (meth)acrylate, isopropyl (meth) acrylate, butyl (meth)acrylate, isobutyl (meth)acrylate, pentyl (meth)acrylate, isoamyl (meth)acrylate, hexyl (meth) acrylate, 2-ethylhexyl (meth)acrylate, decyl (meth)acrylate, isodecyl (meth)acrylate, lauryl (meth)acrylate, octyl (meth) acrylate, nonyl (meth)acrylate, hydroxyethyl acrylate, hydroxyethyl methacrylate, hydroxypropyl (meth)acrylate, and mixtures thereof.

The one or more non-cyclic (meth)acrylate monomers may constitute greater than about 10%, more preferably greater than about 20%, and even more preferably greater than about 30% by weight of the latex copolymer, based on the total weight of the reactant monomers. The non-cyclic (meth)acrylate monomers may also constitute less than about 70% or about 80%, more preferably less than about 60%, and even more preferably less than about 50% by weight of the latex copolymer, based on the total weight of the reactant monomers.

The above-discussed non-cyclic (meth)acrylate monomers refer to monomers each having a single ethylenically-unsaturated group, allowing these monomers to be polymerized to produce monomer units of the copolymer chains for the latex copolymer. In addition, the reactant monomers may also include one or more monomers each having two or more ethylenically-unsaturated groups (referred to as "multi-unsaturated monomers"), which preferably react during the emulsion polymerization to crosslink the otherwise separate copolymer chains and/or to function as growth sites for adjacent copolymer chains. Examples of suitable compounds for the multi-unsaturated monomers include monomers having two or more ethylenically-unsaturated groups, such as multi-functional (meth)acrylate monomers, multi-functional vinyl monomers, multi-functional maleate monomers, multi-functional olefin monomers, and the like. Illustrative multi-unsaturated monomers include those represented by the following structure:

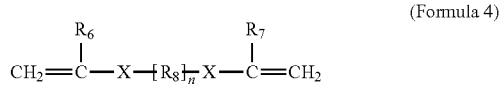

(Formula 4)

where groups $R_6$ and $R_7$ may independently be a hydrogen atom or an organic group, such as a $C_1$-$C_6$ alkyl group, and more preferably a hydrogen atom or a methyl group. Additionally, one or both of the hydrogen atoms attached to the terminal carbon atom of each ethylenically-unsaturated group may independently be replaced with a group $R_6$. Groups X may each independently be a —COO— ester group, may be independently be substituted with an organic group, such as a hydrocarbon group (e.g., for producing an allyl terminal group) or another heteroatom-containing group (e.g., another type of divalent step-growth linkage group), or may be omitted.

Group $R_8$ may be any suitable divalent group, such as, for example, a $C_2$, $C_3$, $C_4$, $C_5$, or $C_6$ hydrocarbon group, where one or more hydrogen atoms of the hydrocarbon group may each optionally be substituted with a group $R_6$, a polar group (e.g., a hydroxy group, an amino group, and the like), and an alkoxy group, for example. In some embodiments, group $R_8$ is selected from a $C_2$, $C_3$, $C_4$, $C_5$, or $C_6$ hydrocarbon moiety. In some embodiments, group $R_8$ may include one or more cyclic groups, which may be saturated, unsaturated, or aromatic, and may be monocyclic or polycyclic groups.

In additional preferred embodiments, each unsaturated bond (e.g., double bond) is connected to a terminal carbon of the molecule (e.g., a $CH_2$ group), as shown in Formula 4. In further additional embodiments, one or more hydrogen atoms of the hydrocarbon group in group $R_8$ may also be substituted with a branched ethylenically-unsaturated group, such that the multi-unsaturated monomer may have a total of three or more ethylenically-unsaturated groups.

Specific examples of suitable multi-functional (meth) acrylates include polyhydric alcohol esters of acrylic acid or methacrylic acid, such as ethanediol di(meth)acrylate, propanediol di(meth)acrylate, butanediol di(meth)acrylate (e.g., 1,3-butanediol dimethacrylate and 1,4-butanediol di(meth) acrylate), heptanediol di(meth)acrylate, hexanediol di(meth) acrylate, trimethylolethane tri(meth)acrylate trimethylolpropane tri(meth)acrylate, trimethylolbutane tri(meth)acrylate, trimethylolheptane tri(meth)acrylate, trimethylolhexane tri (meth)acrylate, tetramethylol methane tetra(meth)acrylate, dipropylene glycol di(meth)acrylate, trimethylol hexane tri (meth)acrylate, pentaerythritol tetra(meth)acrylate, isosorbide di(meth)acrylate, and mixtures thereof.

In some embodiments, group $R_6$, $R_7$, and/or $R_8$, may form one or more ring structures with one or more of the terminal carbon atoms of the ethylenically-unsaturated groups. These can form ethylenically-unsaturated ring structures, such as norbornene methylolacrylate, dicyclopentadiene, mixtures thereof, and the like.

In alternative embodiments, other linkage monomers can be used instead of (or in addition to) the multi-functional (meth)acrylates, where the linkage monomers include at least two different functional groups, such as an ethylenically-unsaturated group and an oxirane group (e.g., GMA or glycidyl acrylate). In these embodiments, one of the ethylenically-unsaturated groups in Formula 5 shown above may be replaced with an alternative functional group that is configured to react with a reciprocating functional group of a copolymer chain (e.g., an oxirane group for reacting with a hydroxyl group of a copolymer chain).

However, in some preferred embodiments, the reactant components are substantially free or completely free of glycidyl methacrylate ("GMA") and glycidyl acrylate. In more preferred embodiments, the reactant components are substantially free or completely free of monomers having oxirane groups. These preferred embodiments may also apply to resulting latex copolymer, the latex emulsion, the coating composition, and the cured coating. As such, in preferred embodiments, the latex copolymer, the latex emulsion, the coating composition, and the cured coating are each also substantially free or completely free of mobile or bound GMA and glycidyl acrylate, and/or monomers having oxirane groups. In these embodiments, the monomer shown above in Formula 5 preferably includes two or more ethylenically-unsaturated groups.

The multi-unsaturated (and/or other linkage) monomers, if used, preferably constitute greater than about 1%, more preferably greater than about 5%, more preferably greater than about 8%, even more preferably greater than about 9%, and in some embodiments, greater than about 10%, based on the total weight of the reactant monomers. The multi-unsaturated monomers may also constitute less than about 25%, more preferably less than about 20%, and even more preferably less than about 15%, based on the total weight of the reactant monomers.

Examples of suitable ethylenically-unsaturated acid-functional monomers include ethylenically-unsaturated carboxylic acid monomers, anhydrides thereof, salts thereof, and mixtures thereof. Illustrative ethylenically-unsaturated carboxylic acid monomers include those represented by the following structure:

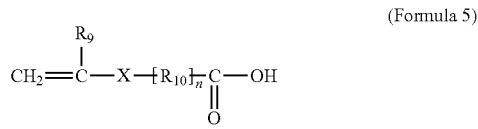

(Formula 5)

where the group $R_9$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_9$. Group $R_{10}$ may be any suitable divalent group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example.

In preferred embodiments, the ethylenically-unsaturated acid-functional monomers are free of oxirane groups or halogen groups, and more preferably both. The integer "n" may be zero or one, more preferably zero such that group $R_{10}$ is omitted and the carboxyl (—COOH) group extends directly from the unsaturated group. In preferred embodiments, the unsaturated bond (e.g., double bond) is connected to a terminal carbon of the molecule (e.g., a $CH_2$ group), as shown in Formula 5.

Examples of suitable ethylenically-unsaturated carboxylic acid monomers include acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, and mixtures thereof. Preferred ethylenically-unsaturated carboxylic acid monomers include acrylic acid, methacrylic acid, crotonic acid, fumaric acid, maleic acid, 2-methyl maleic acid, itaconic acid, 2-methyl itaconic acid, and mixtures thereof.

Examples of suitable ethylenically-unsaturated anhydride monomers include compounds derived from the above-discussed ethylenically-unsaturated carboxylic acid monomers (e.g., as pure anhydride or mixtures of such). Preferred ethylenically-unsaturated anhydrides include acrylic anhydride, methacrylic anhydride, and maleic anhydride. If desired, salts of the above ethylenically-unsaturated carboxylic acid monomers may also be employed.

The ethylenically-unsaturated acid-functional monomers may collectively constitute greater than about 1%, more preferably greater than about 3%, and even more preferably greater than about 5% by weight, based on the total weight of the reactant monomers. The ethylenically-unsaturated acid-functional monomers may also collectively constitute less than about 40%, more preferably less than about 30%, and even more preferably less than about 20%, based on the total weight of the reactant monomers.

The optional polymerizable surfactants may assist in dispersing the reactant monomers in the aqueous carrier, as well as optionally polymerizing with each other and/or the reactant monomers to form the copolymer chains. As such, in some embodiments, the polymerizable surfactants are preferably capable of polymerizing or otherwise reacting under free radical-initiated polymerization conditions. For instance, the polymerizable surfactants may each have one or more hydrophobic portions, one or more hydrophilic portions, and an ethylenically-unsaturated group located at the hydrophobic portion, at the hydrophilic portion, or in-between.

The hydrophobic portion(s) may be any suitable substituted or unsubstituted hydrocarbon chain, such as a substituted or unsubstituted alkyl or alkenyl group, a substituted or unsubstituted cyclic hydrocarbon group, a substituted or unsubstituted aromatic hydrocarbon group, and combinations thereof. The hydrophobic portion(s) preferably include one or more non-polar groups, such as one or more aromatic groups.

The hydrophilic portion(s) may be any suitable substituted or unsubstituted hydrocarbon chain, such as a substituted or unsubstituted alkyl or alkenyl chain, optionally with one or more ether linkages, which terminates in a polar group. The polar group may include one or more hydroxyl groups, acid groups (e.g., carboxylic acid groups), sulfonate groups, sulfinate groups, sulfate groups, phosphate groups, phosphinate groups, phosphonate groups, salt derivatives thereof, and combinations thereof.

Examples of suitable polymerizable surfactants include those disclosed in U.S. Publication No. 2002/0155235; and those commercially available under the tradename "REA-SOAP" from Adeka Corporation, Tokyo, Japan, under the tradenames "NOIGEN" and "HITENOL" from Da-Ichi Kogyo Siyyaku Co., Ltd., Tokyo, Japan; and under the tradename "SIPOMER" from Solvay Rhodia, Brussels, Belgium.

In embodiments that include polymerizable surfactants, the polymerizable surfactants may constitute greater than about 1%, more preferably greater than about 2%, and even more preferably greater than about 3% by weight, based on the total weight of the reactant monomers. The polymerizable surfactant may also constitute less than about 25%, more preferably less than about 15%, and even more preferably less than about 10% by weight, based on the total weight of the reactant monomers.

In preferred embodiments, the reactant monomers include a combination of one or more styrene-offset monomers, one or more non-cyclic (meth)acrylate monomers, and one or more ethylenically-unsaturated acid-functional monomers.

In certain preferred embodiments, the reactant monomer further include one or both of: (i) one or more multi-unsaturated monomers, and (ii) one or more polymerizable surfactants.

The non-cyclic (meth)acrylates may constitute from about 20% to about 50% by weight, and more preferably from about 30% to about 40% by weight; the (meth)acrylic acids may constitute from about 1% to about 25% by weight, and more preferably from about 5% to about 15% by weight; and the optional polymerizable surfactants may constitute from 0% to about 15% by weight, and more preferably from about 5% to about 10% by weight; based on the entire weight of the reactant monomers used to produce the latex copolymer.

In some aspects, some of the non-cyclic (meth)acrylate monomers may terminate in polar groups, such as hydroxyl groups. In these embodiments, the non-cyclic (meth)acrylate monomers with the terminal polar groups (preferably hydroxyl groups) may constitute from about 1% to about 20% by weight, and more preferably from about 5% to about 15% by weight; based on the entire weight of the reactant monomers. The non-cyclic (meth)acrylate monomers without the terminal polar groups may accordingly constitute the remainder of the non-cyclic (meth)acrylate monomers.

A first more preferred combination of reactant monomers includes one or more ethylenically-unsaturated polycyclic monomers, one or more non-aromatic (meth)acrylate monomers, one or more (meth)acrylic acids, and optionally one or both of: (i) one or more multi-functional (meth)acrylate monomers and (ii) one or more polymerizable surfactants.

In this embodiment, the ethylenically-unsaturated polycyclic monomer(s) preferably constitute at least about 10% by weight of the monomers used to produce the latex copolymer, and the reactant monomers may also optionally include one or more non-styrenic, ethylenically-unsaturated monocyclic monomers. In some embodiments, the ethylenically-unsaturated polycyclic monomer(s) preferably constitute at least about 20% by weight, and/or at least about 30% by weight, based on a total weight of the monomers used to produce the latex copolymer.

A second more preferred combination of reactant monomers includes one or more ethylenically-unsaturated monocyclic monomers each having a ring structure with 3-5 atoms in the ring, one or more non-cyclic (meth)acrylate monomers, one or more (meth)acrylic acids, and optionally one or both of: (i) one or more multi-functional (meth)acrylate monomers and (ii) one or more polymerizable surfactants.

In this embodiment, the ethylenically-unsaturated, monocyclic monomer(s) with 3-5 atom rings preferably constitute at least about 5% by weight or at least about 10% by weight of the monomers used to produce the latex copolymer, and the reactant monomers may also optionally include one or more non-styrenic, ethylenically-unsaturated monocyclic monomers having six or more atoms in the ring. In some embodiments, the ethylenically-unsaturated monocyclic monomers each having a ring structure with 3-5 atoms in the ring preferably constitute at least about 20% by weight, and/or at least about 30% by weight, based on a total weight of the monomers used to produce the latex copolymer.

A third more preferred combination of reactant monomers includes one or more ethylenically-unsaturated polycyclic monomers, one or more ethylenically-unsaturated monocyclic monomers each having a ring structure with 3-5 atoms in the ring, one or more non-cyclic (meth)acrylate monomers, one or more (meth)acrylic acids, and optionally one or both of: (i) one or more multi-functional (meth)acrylate monomers and (ii) one or more polymerizable surfactants.

In this embodiment, the combined concentrations of the ethylenically-unsaturated polycyclic monomer(s) and the ethylenically-unsaturated monocyclic monomer(s) each having a ring structure with 3-5 atoms in the ring preferably constitute at least about 10% by weight of the monomers used to produce the latex copolymer. In this case, the reactant monomers may also optionally include one or more non-styrenic, ethylenically-unsaturated monocyclic monomers having six or more atoms in the ring. In some embodiments, the combined concentrations of the ethylenically-unsaturated polycyclic monomer(s) and the ethylenically-unsaturated monocyclic monomer(s) each having a ring structure with 3-5 atoms in the ring preferably constitute at least about 10% by weight, at least about 20% by weight, or at least about 30% by weight, based on a total weight of the monomers used to produce the latex copolymer.

The aqueous carrier may include water, and optionally, one or more organic solvents. Examples of suitable organic solvents for use in the aqueous carrier may include methanol, ethanol, isopropyl alcohol, butyl alcohols (e.g., n-butanol and buytl glycol), 2-butoxyethanol, 2-(2-butoxyethoxy) ethanol (i.e., butyl carbitol), aromatic solvents, isophorones, glycol ethers, glycol ether acetates, acetone, methyl-ethyl ketones (MEK), N,N-dimethylformamides, ethylene carbonates, propylene carbonates, diglymes, N-methylpyrrolidones (NMP), ethyl acetates, ethylene diacetates, propylene glycol diacetates, alkyl ethers of ethylene, propylene glycol monoacetates, toluene, xylenes, and combinations thereof.

Optionally, one or more non-polymerizable surfactants (e.g., non-polymeric surfactants) may also be used (i.e., alone or in combination with one or more polymerizable surfactants, or one or more polymeric surfactant such as, e.g., acrylic polymers having water-dispersing groups such as neutralized acid or base groups), such as surfactants that can support emulsion polymerization reactions. For example, the non-polymerizable surfactant(s) may include surfactants containing sulfonate groups, sulfate groups, phosphate groups, phosphinate groups, phosphonate groups, and combinations thereof; as well as ethoxylated surfactants. An example of a non-polymerizable surfactant includes dodecylbenzene sulfonic acid and sulfonates thereof (e.g., dodecylbenzene sulfonate salts, and particularly amine- or ammonia-neutralized salts).

The concentration of non-polymerizable surfactants may vary depending on the types and concentrations of the reactant components, including the presence of any polymerizable surfactants. In embodiments that include non-polymerizable surfactants, the non-polymerizable surfactants may constitute greater than about 0.01%, greater than about 0.05%, or greater than about 0.1% by weight, relative to a total weight of the reactant components. The non-polymerizable surfactants may also constitute less than about 10%, less than about 7%, or less than about 5% by weight, relative to the total weight of the reactant components.

Although it is contemplated that surfactants that are non-polymerizable and non-polymeric can be used in some embodiments, it is generally preferable to use a polymeric surfactant and/or a polymerizable surfactant to, for example, minimize or eliminate the possibility of surfactant migrating out of the cured coating and into the packaged product.

In some preferred embodiments, a polymeric surfactant having a sufficient amount of water-dispersing groups (e.g., salt, or salt-forming groups, such as neutralized acid or neutralized base groups) to facilitate the emulsion polymerization of the reactant monomers may be used to support the emulsion polymerization, either alone or in combination with any of the other types of surfactants referenced herein.

Examples of polymer-based surfactants include those disclosed in U.S. Pat. No. 8,092,876 and PCT International Publication Number WO2014/140057, each of which is incorporated by reference to the extent that it doesn't conflict with the present disclosure. In these embodiments, the polymer surfactants can constitute up to about 40% by solids weight in the aqueous dispersion. Such polymeric surfactants may be acrylic polymers, epoxy polymers, polyester polymers, polyolefins (e.g., (poly)ethylene (meth) crylic acid copolymers such as, e.g., the PRIMACOR 5980i or PRIMACOR 5990i products), polyurethane polymers, or copolymers or mixtures thereof, with acrylic polymeric surfactants being particularly preferred.

The emulsion polymerization process may be conducted in a variety of manners. In some preferred embodiments, the emulsion polymerization process uses a pre-emulsion monomer mixture in which some or all of the reactant components and any optional surfactants are dispersed in the aqueous carrier under agitation to form a stable pre-emulsion.

A portion of the surfactants (e.g., polymerizable and/or non-polymerizable) and a portion of the aqueous carrier may also be introduced into a reactor, and are preferably heated, agitated, and held under nitrogen sparge to assist in the subsequent polymerization reactions. Preferred temperatures for heating the surfactant dispersion include temperatures greater than about 65° C., and more preferably from about 70° C. to about 90° C.

The pre-emulsion may then be fed to the heated aqueous dispersion in the reactor incrementally or continuously over time. Alternatively, in certain embodiments a batch or semi-batch process may be used to polymerize the reactant monomers in the aqueous dispersion, as described in, for example, U.S. Pat. No. 8,092,876. In further embodiments, the polymerization process can occur in a classic two-stage (or multiple stage) core-shell arrangement. Alternatively, the polymerization process can occur in a multiple stage "inverse core shell" arrangement as discussed in International Publication No. WO2015/002961. Intermediate hybrids of these processes may also be used.

One or more polymerization initiators may also be added to the aqueous dispersion (e.g., along with the reactant components) at any suitable time(s) to initiate the emulsion polymerization. Suitable polymerization initiators include free-radical initiators, such as one or more peroxides and/or persulfates and similar compounds. Examples of suitable peroxides include hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates; and mixtures thereof.

Azoic compounds can also be used to generate free radicals such as 2,2'-azo-bis(isobutyronitrile), 2,2'-azo-bis(2,4-dimethylvaleronitrile), and 1-t-butyl-azocyanocyclohexane, and mixtures thereof. Examples of suitable persulfates include persulfates of ammonium or alkali metal (potassium, sodium or lithium). Perphosphates can be also a source of free radicals, and mixtures thereof.

Polymerization initiators can be used alone or as the oxidizing component of a redox system, which also typically includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, ferrous complexes (e.g., ferrous sulphate heptahydrate), and mixtures thereof. The reducing component is frequently referred to as an accelerator or a catalyst activator.

The initiator and accelerator (if used) are preferably each used in concentrations greater than about 0.001%, more preferably greater than about 0.01%, and more preferably greater than about 0.1% by weight, relative to the total weight of the reactant components. The initiator and accelerator (if used) are also each preferably used in concentrations less than about 5%, more preferably less than about 3%, and in some embodiments, less than about 1% by weight, relative to the total weight of the reactant components.

Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe (II), and ammonium persulfate/sodium bisulfate/sodium hydrosulfite/Fe(II).

The emulsion polymerization may continue for a suitable duration to polymerize the reactant components with a free-radical initiated polymerization process. This can produce each latex copolymer as a particle dispersed or otherwise suspended in the aqueous solution. And, in some embodiments, where each latex copolymer has linear and/or branched copolymer chains that are preferably cross-linked with linkages derived from the multi-unsaturated or other linkage monomers.

After the polymerization is completed, in some embodiments, at least a portion of the carboxylic acid groups and/or anhydride groups of the latex copolymer (or other salt-forming groups such as, e.g., neutralizable base groups) may be neutralized or partially neutralized with a suitable basic compound (or other suitable neutralizing compound) to produce water-dispersing groups. The basic compound used for neutralization is preferably a fugitive base, more preferably a fugitive nitrogen base (e.g., ammonia and primary, secondary, and/or tertiary amines), with amines being particularly preferred. Other suitable bases may include the metallic bases described in the application filed on the same date herewith and entitled "Latex Polymers Made Using Metallic-Base-Neutralized Surfactant and Blush-Resistant Coating Compositions Containing Such Polymers".

Some examples of suitable amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Triethyl amine and dimethyl ethanol amine are preferred amines.

The degree of neutralization required may vary considerably depending upon the amount of acid or base groups included in the latex copolymer, and the degree of dispersibility that is desired. In embodiments in which neutralized acid groups are used for water dispersibility, preferred acid numbers for the copolymer prior to neutralization include acid numbers greater than about 40, more preferably greater than about 80, and even more preferably greater than about 100 milligrams (mg) potassium hydroxide (KOH) per gram of the latex copolymer.

Preferred acid numbers for the latex copolymer prior to neutralization also include acid numbers less than about 400, more preferably less than about 350, and even more preferably less than about 300 mg KOH per gram of the latex copolymer. Acid numbers referred to herein may be calculated pursuant to BS EN ISO 3682-1998 standard, or alternatively may be theoretically determined based on the reactant monomers.

Typically, to render the latex copolymer water-dispersible, at least 25% of the acid groups of the latex copolymer are neutralized, preferably at least 30% are neutralized, and more preferably at least 35% are neutralized. Preferably, the latex copolymer includes a sufficient number of water-dispersing groups to form a stable dispersion in the aqueous carrier. Furthermore, in embodiments incorporating polymerizable surfactants and/or other surfactants, the hydrophilic portions of the surfactant may also assist in dispersing the latex copolymer in the aqueous carrier.

While the latex copolymer has been primarily described herein with acid-based water-dispersing groups that are neutralized with basic compounds, in alternative embodiments, the water-dispersing groups may be basic groups that are neutralized with acidic compounds. Examples of suitable basic groups for this embodiment include those disclosed in O'Brien et al., U.S. Pat. No. 8,092,876. Examples of suitable acidic neutralizing compounds include formic acid, acetic acid, hydrochloric acid, sulfuric acid, and mixtures thereof.

After polymerization and/or neutralization, the resulting particles of the latex copolymer are provided in the aqueous carrier as a dispersion of the latex copolymer. In some preferred embodiments, the copolymer chains of the latex copolymer may include one or more ester groups, one or more hydroxyl groups, one or more water-dispersing groups (e.g., carboxylic acid groups, anhydride groups, and/or neutralized salts thereof), and/or one or more cyclic groups (e.g., aromatic groups). Additionally, the copolymer chains may be cross-linked by one or more linkages from the multi-unsaturated monomers to produce the latex copolymer.

The coating composition may be formulated from the latex emulsion, optionally with the inclusion of one or more additives and/or by rheological modification for different coating applications (e.g., diluted for spray coating applications). In embodiments in which the coating composition includes one or more additives, the additives preferably do not adversely affect the latex emulsion, or a cured coating formed from the coating composition. For example, such optional additives may be included in the coating composition to enhance composition aesthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow control agents, thixotropic agents, dispersing agents, antioxidants, adhesion promoters, light stabilizers, co-resins and mixtures thereof. Each optional additives is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in an non-volatile amount of no greater than about 3% by weight, and more preferably no greater than about 1% by weight, based on the total solids weight of the coating composition.

Another useful optional ingredient is a lubricant (e.g., a wax), which facilitates manufacture of metal closures and other fabricated coated articles by imparting lubricity to sheets of coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional ingredient is an organosilicon material, such as a siloxane-based and/or polysilicone-based materials. Representative examples of suitable such materials are disclosed in International Publication Nos. WO/2014/089410 and WO/2014/186285.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

The coating composition may also incorporate one or more optional curing agents (e.g., crosslinking resins, sometimes referred to as "crosslinkers"). The choice of particular crosslinker typically depends on the particular product being formulated. For example, some coatings are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of BPA, BPF, BPS, glycidyl ether compounds thereof (e.g., BADGE), and epoxy novolacs.

Any of the well known hydroxyl-reactive curing resins can be used. For example, phenoplast, blocked isocyanates, and aminoplast curing agents may be used, as well as combinations thereof. Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303.

As examples of other generally suitable curing agents are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a number-average molecular weight of at least about 300, more preferably at least about 650, and even more preferably at least about 1,000.

The concentration of the curing agent (e.g., crosslinker) in the coating composition may depend on the type of curing agent, the time and temperature of the bake, and the molecular weights of the copolymer particles. If used, the crosslinker is typically present in an amount of up to about 50% by weight, preferably up to about 30% by weight, and more preferably up to about 15% by weight. If used, the crosslinker is typically present in an amount of at least about 0.1% by weight, more preferably at least about 1% by weight, and even more preferably at least about 1.5% by weight. These weight percentages are based on the total resin solids weight of the coating composition.

In some embodiments, the coating composition may be cured without the use of an external crosslinker (e.g., without phenolic crosslinkers). Additionally, the coating composition may be substantially free of formaldehyde and formaldehyde-containing materials, more preferably essentially free of these compounds, even more preferably essentially completely free of these compounds, and most preferably completely free of these compounds.

In preferred embodiments, the coating composition is also substantially free or completely free of any structural units derived from bisphenol A ("BPA"), bisphenol F ("BPF"), bisphenol S ("BPS"), or any diepoxides thereof (e.g., diglycidyl ethers thereof such as the diglycidyl ether of BPA ("BADGE")). In addition, the coating composition is preferably substantially free or completely free of any structural units derived from a dihydric phenol, or other polyhydric phenol, having estrogenic agonist activity great than or equal to that of 4,4'-(propane-2,2-diyl)diphenol. More preferably, the coating composition is substantially free or completely free of any structural units derived from a dihydric phenol, or other polyhydric phenol, having estrogenic agonist activity greater than or equal to that of BPS. In some embodiments, the coating composition is substantially free or completely free of any structural units derived from a bisphenol.

Even more preferably, the coating composition is substantially free or completely free of any structural units derived from a dihydric phenol, or other polyhydric phenol, having estrogenic agonist activity greater than 4,4'-(propane-2,2-diyl)bis(2,6-dibromophenol). Optimally, the coating composition is substantially free or completely free of any structural units derived from a dihydric phenol, or other polyhydric phenol, having estrogenic agonist activity greater than 2,2-bis(4-hydroxyphenyl)propanoic acid. The same is preferably true for any other components of a composition including the coating composition. See, for example, U.S. Publication No. 2013/0316109 for a discussion of such structural units and applicable test methods.

In some further embodiments, the coating composition is substantially free or completely free of any acrylamide-type monomers (e.g., acrylamides or methacrylamide). Moreover, in some embodiments, the coating composition is substantially free or completely free of one or more of styrene (whether free or polymerized) and/or substituted styrene compounds (whether free or polymerized). As discussed above, in these embodiments, the reactant monomers may include other ethylenically-unsaturated aromatic compounds and/or ethylenically-unsaturated alicyclic compounds, such as aromatic (meth)acrylates and/or alicyclic (meth)acrylates, for example. In additional further embodiments, the coating composition is substantially free or completely free of halogenated monomers (whether free or polymerized), such as chlorinated vinyl monomers.

The coating composition may also optionally be rheologically modified for different coating applications. For example, the coating composition may be diluted with additional amounts of the aqueous carrier to reduce the total solids content in the coating composition. Alternatively, portions of the aqueous carrier may be removed (e.g., evaporated) to increase the total solids content in the coating composition. The final total solids content in the coating composition may vary depending on the particular coating application used (e.g., spray coating), the particular coating use (e.g., for interior can surfaces), the coating thickness, and the like.

In some embodiments, the coating composition preferably has a total solids weight greater than about 5%, more preferably greater than about 10%, and even more preferably greater than about 15%, based on the total weight of the coating composition. The coating composition also preferably has a total solids weight less than about 80%, more preferably less than about 60%, and even more preferably less than about 50%, based on the total weight of the coating composition. The aqueous carrier may constitute the remainder of the weight of the coating composition.

In some embodiments, such as for certain spray coating applications (e.g., inside spray for food or beverage cans including, e.g., aluminum beverage cans), the coating composition may have a total solids weight greater than about 5%, more preferably greater than about 10%, and even more preferably greater than about 15%, based on the total weight of the coating composition. In these embodiments, the coating composition may also have a total solids weight less than about 40%, more preferably less than about 30%, and even more preferably less than about 25%, based on the total weight of the coating composition. In some of these embodiments, the coating composition may have a total solids weight ranging from about 18% to about 22%. The aqueous carrier may constitute the remainder of the weight of the coating composition.

The coating composition preferably includes at least a film-forming amount of the latex copolymer. In some embodiments, the latex copolymer preferably constitutes greater than about 50%, more preferably greater than about 65%, and even more preferably greater than about 80% by weight of the coating composition, based on the entire weight of the total resin solids in the coating composition. The particles of the latex copolymer may constitute 100% or less, more typically less than about 99%, and even more typically less than about 95% by weight of the coating composition, based on the entire weight of the total resin solids in the coating composition.

If desired, the coating composition may also include one or more other optional polymers in addition to the latex copolymers, such as, for example, one or more acrylic polymers, alkyd polymers, epoxy polymers, polyolefin polymers, polyurethane polymers, polysilicone polymers, polyester polymers, and copolymers and mixtures thereof.

As previously discussed, the aqueous carrier of the coating composition preferably includes water and may further include one or more optional organic solvents. In some embodiments, water constitutes greater than about 20% by weight, more preferably greater than about 35% by weight, and even more preferably greater than about 50% by weight of the total weight of the aqueous carrier. In some embodiments, water constitutes 100% or less, more preferably less than about 95% by weight, and even more preferably less than about 90% by weight of the total weight of the aqueous carrier.

While not intending to be bound by theory, the inclusion of a suitable amount of an organic solvent can be advantageous, in some embodiments (e.g., for certain coil coating applications to modify flow and leveling of the coating composition, control blistering, and maximize the line speed of the coil coater). Accordingly, in certain embodiments, the organic solvents may constitute greater than 0%, more preferably greater than about 5%, and even more preferably greater than about 10% by weight of the aqueous carrier, based on the total weight of the aqueous carrier. In these embodiments, the organic solvents may also constitute less than about 80%, more preferably less than about 50%, and even more preferably less than about 40% by weight of the aqueous carrier, based on the total weight of the aqueous carrier.

The coating composition preferably has a viscosity suitable for a given coating application. In some embodiments, such as for certain spray coating applications (e.g., those discussed below for FIGS. 2 and 3), the coating composition may have an average viscosity greater than about 5 seconds, more preferably greater than 10 seconds, and even more preferably greater than about 15 seconds, based on the Viscosity Test described below (Ford Viscosity Cup #4 at 25° C.). In some embodiments, the coating composition may also have an average viscosity less than about 40 seconds, more preferably less than 30 seconds, and even more preferably less than about 25, based on the Viscosity Test described below.

The coating composition of the present disclosure with the aqueous dispersion of the latex copolymer particles may be applied on a variety of different substrates using a variety of different coating techniques. In preferred embodiments, the coating composition is applied as an inside spray coating. As briefly described above, cured coatings formed from the coating composition are particularly suitable for use on metal food and beverage cans (e.g., two-piece cans, three-piece cans, and the like). Two-piece cans (e.g., two-piece beer or soda cans and certain food cans) are typically manufactured by a drawn and ironing ("D&I") process. The cured coatings are also suitable for use in food or beverage contact situations (collectively referred to herein as "food-contact"), and may be used on the inside or outside of such cans.

For instance, FIG. 1 shows container 20, which is a simplified example of a food or beverage container that may be coated with the coating composition of the present disclosure. Container 20 may be a two-piece can having body 22 and lid piece 24, where body 22 includes sidewall 26 and bottom end 28. Lid piece 24 may be sealed to body 22 in any suitable manner, and may optionally include one or more tabs (not shown) to facilitate peeling off or opening of lid piece 24 or a portion thereof (e.g., as is common for beverage can ends and easy-open food can ends).

Sidewall 26 and bottom end 28 respectively include interior surfaces 30 and 32, and suitable substrate materials for sidewall 26 and bottom end 28 include metallic materials, such as aluminum, iron, tin, steel, copper, and the like. One or more portions of interior surfaces 30 and 32 (or exterior surface) may be coated with coating 34, which is a cured coating formed from the coating composition of the present disclosure. In some embodiments, the interior surface of lid piece 24 may also be coated with coating 34.

Figure 2:
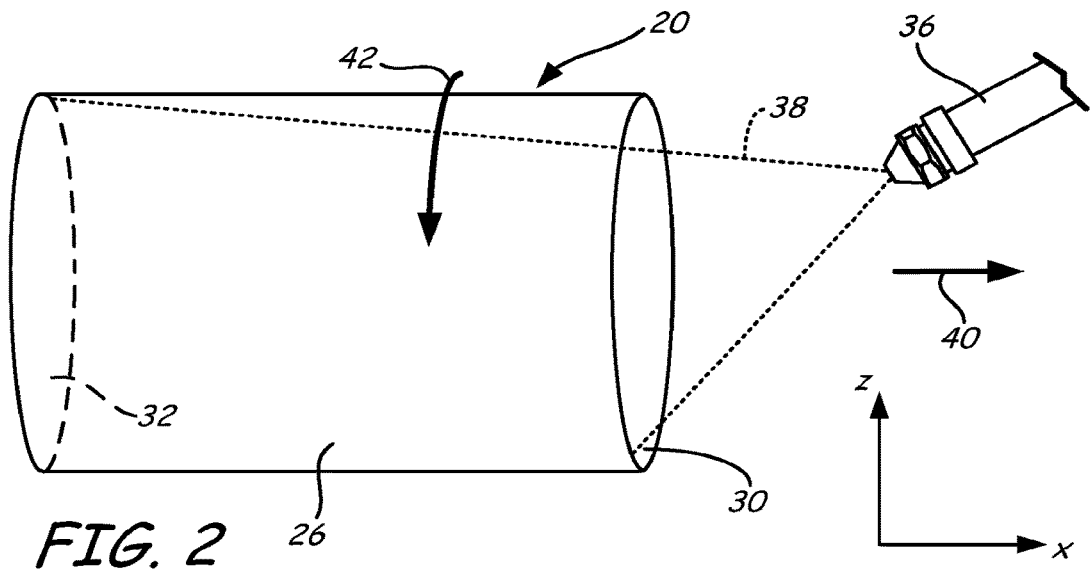
FIG. 2 is a side view of an example spray coating process for spraying the coating composition of the present disclosure onto an interior surface of a can, such as a food or beverage can.
Figure 3:
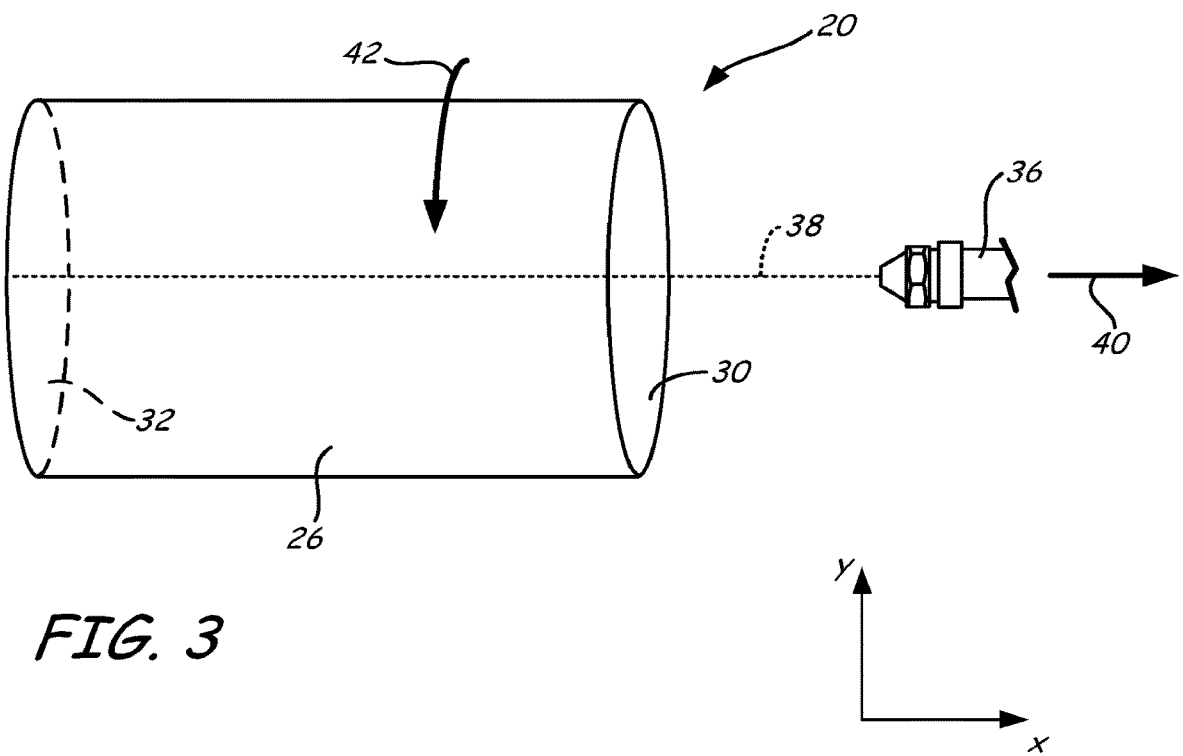
FIG. 3 is a top view of the example spray coating process shown in FIG. 2.

A suitable spray coating technique for applying the coating composition to an interior surface of a food or beverage can (e.g., surfaces 30 and 32) may involve spraying the coating composition using one or more spray nozzles capable of uniformly coating the inside of the can. For example, FIG. 2 illustrates a side view, and FIG. 3 illustrates a top view of an example setup for spray coating the coating composition onto the interior surfaces 30 and 32 of a can 20 with a spray nozzle 36 (prior to necking of an upper portion of sidewall 26). As shown, the spray nozzle 36 is preferably a controlled-pattern nozzle capable of generating a desired spray pattern, such as spray 38 having a flat-fan pattern as generally illustrated in FIGS. 2 and 3.

Furthermore, spray nozzle 36 is preferably stationary, and also preferably generates spray 38 without air pressure (e.g., an airless spray operation). In some embodiments (e.g., in which the can to be sprayed is large), spray nozzle 36 may utilize a "lance spray" technique, where spray nozzle 36 may move relative to the can to reach the far inside end of the can.

In addition, the can 20 itself may be engaged to a rotating mechanism (e.g., a drive roller or belt, and/or a rotatable chuck mount), which is configured to rotate the can 20 at a high speed (e.g., about 2,200 rpm) around its longitudinal axis 40, as illustrated by arrows 42. This rotation of the can 20 preferably spreads the sprayed coating composition evenly across the entire interior surfaces 30 and 32. As can be seen in FIG. 2, the flat-fan pattern of spray 38 is not evenly aligned with the longitudinal axis 40 of the can 20. As such, the pattern of spray 38, as dictated by spray nozzle 36, may be non-homogenous, where the lower portion of spray 38 has a greater density of the coating composition compared to the upper portion of spray 38.

After the spray coating application, each can 20 may be moved to a curing oven to cure the sprayed coating composition, which is preferably performed within about 40 to 200 seconds from the spraying step. The curing process is preferably performed in bulk with multiple cans 20 arranged together on a continuously moving conveyor belt or track. The curing oven preferably heats the cans 20 to a suitable temperature to cure the coating composition, but that is also preferably not too high so as to degrade the coating composition, any other existing coatings on cans 20, and/or the metal materials of cans 20.

Preferred inside spray coating compositions of the present disclosure are capable of being spray applied on an interior of a food or beverage can (e.g., a 2-piece food or beverage can) to effectively, and evenly, coat the substrate and form a continuous cured coating (e.g., a coating that exhibits a suitable initial metal exposure value, thereby indicating that the substrate has been effectively coated and is free of unsuitable holes or other discontinuities in the coating).

Suitable curing temperatures for the coating composition of the present disclosure are greater than about 150° C. (about 300° F.), more preferably greater than about 165° C. (about 330° F.), and even more preferably greater than about 180° C. (about 360° F.). In some embodiments, suitable curing temperatures for the coating composition of the present disclosure are also less than about 220° C. (about 430° F.), more preferably less than about 205° C. (about 400° F.), and even more preferably less than about 195° C. (about 380° F.). These temperatures are based on peak metal temperature measurements of the metal walls of the cans 20 as they pass through the curing oven. For example, multiple cans 20 may be grouped together with a test can that is wired with thermocouples to measure the temperatures of one or more portions of the metal walls to ensure the cans 20 are heated enough.

Suitable residence times in the curing oven for the above-discussed temperatures range from about 40 seconds to about three minutes, more preferably about one minute to about two minutes. After curing, the resulting cured coatings (e.g., coating 34) may have suitable film thicknesses for protecting the cans 20 from food or beverage products that are subsequently filled into the cans 20.

The desired film thickness for the cured coating may vary depending on the particular food or beverage to be filled in a given can 20. In some embodiments for the spray coating application (e.g., inside spray for food or beverage cans), the average film thickness after curing is greater than about 0.7 milligrams/square-inch (mg/inch$^2$), more preferably greater than about 0.8 mg/inch$^2$, and even more preferably greater than about 0.9 mg/inch$^2$. In these embodiments, the average film thickness after curing is also less than about 4.0 mg/inch$^2$, more preferably less than about 3.0 mg/inch$^2$, and even more preferably less than about 2.5 mg/inch$^2$.

In some further embodiments, the average film thickness after curing ranges from about 0.9 mg/inch$^2$ to about 1.1 mg/inch$^2$. In other further embodiments, the average film thickness after curing ranges from about 1.4 mg/inch$^2$ to about 1.6 mg/inch$^2$. In yet other further embodiments, the average film thickness after curing ranges from about 1.9 mg/inch$^2$ to about 2.1 mg/inch$^2$.

Alternatively, the coating composition may optionally be applied as a coil coating. During a coil coating application, a continuous coil composed of a metal (e.g., steel or aluminum) is coated with the coating composition of the present disclosure. Once coated, the coating coil may be subjected to a short thermal, ultraviolet, and/or electromagnetic curing cycle, for hardening (e.g., drying and curing) of the coating composition. Coil coatings provide coated metal (e.g., steel and/or aluminum) substrates that can be fabricated into formed articles, such as two-piece drawn food cans, food can ends, drawn and ironed cans, beverage can ends, and the like.

The coating composition of the present disclosure also offers utility in other coating applications. These additional applications include, but are not limited to, wash coating, sheet coating, and side seam coatings (e.g., food can side seam coatings). Other commercial coating application and curing methods are also envisioned, for example, electro-coating, extrusion coating, laminating, powder coating, and the like. The coating composition may also be useful in medical or cosmetic packaging applications, including, for example, on surfaces of metered-dose inhalers ("MDIs"), including on drug-contact surfaces.

During the above-discussed curing steps, the aqueous carrier is preferably vaporized or otherwise dried off from the latex copolymer, allowing the copolymer molecules to cure. If desired, the drying and curing steps may be combined in a single step or carried out in separate steps.

Preferred glass transition temperatures for the cured coating of the present disclosure (and particularly interior, food-contact coatings) include those greater than about 50° C., more preferably greater than about 60° C., even more preferably greater than about 70° C., and in some embodiments, greater than about 80° C. Preferred glass transition temperatures for the cured coating include those less than about 120° C., more preferably less than about 115° C., even more preferably less than about 110° C., and in some embodiments, less than about 100° C. The glass transition temperatures can be measured by dynamic mechanical analysis (DMA) or differential scanning calorimetry (DSC). Some multi-unsaturated monomers typically gel when forming homopolymers, which can limit the effectiveness of theoretical calculations using the Flory-Fox Equation.

To further prevent or otherwise reduce coating penetration by an intended food or beverage product, the cured coating is preferably suitably hydrophobic. For example, the cured coating can have a contact angle with deionized water greater than about 90, more preferably greater than about 95, and even more preferably greater than about 100.

The cured coating preferably exhibits desired properties for use as an inside spray coating for food and beverage containers. For example, the cured coating preferably gives a global extraction of less than about 25 parts-per-million (ppm), and more preferably less than about 10 ppm, and even more preferably less than about 1 ppm, pursuant to the Global Extraction test below. Additionally, the cured coating preferably exhibits a metal exposure less than about 5 milliamps (mA), more preferably less than about 2 mA, and even more preferably less than about 1 mA, pursuant to the Initial Metal Exposure test below.

Flexibility is also important so that the coating can deflect with the metal substrate during post-cure fabrication steps (necking and dome reformation) and if the can is dropped from a reasonable height during transport or use. In some preferred embodiments, the cured coating should preferably exhibit a metal exposure less than about 3.5 mA, more preferably less than about 2.5 mA, and even more preferably less than about 1.5 mA, pursuant to the Metal Exposure After Drop Damage test below.

Moreover, the coating composition (uncured) should preferably exhibit substantially no change (e.g., a change in viscosity, if any, of less than 25%, more preferably less than 10%, even more preferably less than 5%, and even more preferably less than 1%) in viscosity pursuant to the Pot Life Stability test below. Accordingly, the coating composition of the present disclosure is particularly suitable for use as an inside spray coating composition for containers configured to retain a variety of different food or beverage products.

Property Analysis and Characterization Procedures

Various properties and characteristics of the latex emulsions, coating compositions, and coatings described herein may be evaluated by various testing procedures as described below:

1. Viscosity Test

This test measures the viscosity of a latex emulsion or coating composition for rheological purposes, such as for sprayability and other coating application properties. The test is performed pursuant to ASTM D1200-88 using a Ford Viscosity Cup #4 at 25° C. The results are measured in the units of seconds.

2. Curing Conditions

For beverage inside spray bakes, the curing conditions involve maintaining the temperature measured at the can dome at 188° C. to 210° C. for 60 seconds. For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.). The constructions cited can be evaluated by tests as follows.

3. Initial Metal Exposure

This test method determines the amount of the inside surface of the can that has not been effectively coated by the sprayed coating. This determination is made through the use of an electrically conductive solution (1% NaCl in deionized water). The interior "inside spray" coating is typically applied using a high pressure airless spray. The following film weights are typically used: 1.0 milligrams per square inch ("msi") for a beer can, 1.5 msi for a soda can, and 2.2 msi for a can intended for use in packaging a "hard-to-hold" product.

The coated can is filled with this room-temperature conductive solution, and an electrical probe is attached in contact to the outside of the can (uncoated, electrically conducting). A second probe is immersed in the salt solution in the middle of the inside of the can.

If any uncoated metal is present on the inside of the can, a current is passed between these two probes and registers as a value on an LED display of a suitable measurement apparatus. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings should give metal exposure values of less than 3 mA, more preferred values of less than 2 mA, and even more preferred values of less than 1 mA. Commercially acceptable metal exposure values are typically less than 2.0 mA on average.

4. Metal Exposure After Drop Damage

Drop damage resistance measures the ability of the coated container to resist cracks after being in conditions simulating dropping of a filled can. The presence of cracks is measured by passing electrical current via an electrolyte solution, as previously described in the Initial Metal Exposure section. A coated container is filled with the electrolyte solution (1% NaCl in deionized water) and the initial metal exposure is recorded. The electrolyte solution is removed and the can is then filled with room-temperature tap water. For two-piece "inside spray" beverage cans, the film weights described in the Initial Metal Exposure test can be used.

The water-filled can, which does not include a "top" can end, is dropped through a cylindrical tube having a 2 and 7/8 inch internal diameter, can bottom down, onto an impact wedge (e.g., an inclined plane angled upwards at 45 degrees). The impact wedge is positioned relative to the tube such that a dent is formed in the rim area where the can bottom end meets the sidewall (typically referred to as the "chime" of a beverage can). The water-filled can is dropped through the tube from a 24-centimeter height (as measured between the can bottom and the point of impact on the impact wedge) onto an inclined plane, causing a dent in the chime area. The can is then turned 180 degrees, and the process is repeated.

Water is then removed from the can and metal exposure is again measured as described above. If there is no damage, no change in current (mA) will be observed relative to the Initial Metal Exposure value. Typically, an average of 6 or 12 container runs is recorded. The metal exposures results for before and after the drop are reported as absolute values. The lower the milliamp value, the better the resistance of the coating to drop damage. Preferred coatings should give metal exposure values after drop damage of less than 3.5 mA, more preferred values of less than 2.5 mA, and even more preferred values of less than 1.5 mA.

5. Adhesion

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure (best), a rating of "9" indicates 90% of the coating remains adhered, a rating of "8" indicates 80% of the coating remains adhered, and so on. Adhesion ratings of 10 are typically desired for commercially viable coatings.

6. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "10" indicates no blush (best) and a rating of "0" indicates complete whitening of the film (worst). Blush ratings of 7 or higher are typically desired for commercially viable coatings, and optimally 9-10.

7. Corrosion Resistance

These tests measure the ability of a coating to resist attack by solutions of different levels of aggressiveness. Briefly, a given coating is subjected to a particular solution, as described below, and then measured for adhesion and blush resistance, each also described below. For each test, a result is given using a scale of 0-10, based on the Adhesion Resistance, Blush Resistance, and/or Bush Adhesion Resistance, where a rating of "10" is best and a rating of "0 is worst.

A. Deionized Water

Deionized water is heated to 82° C. Coated panels are immersed in the heated solution for 30 minutes and then removed, rinsed, and dried. Samples are then evaluated for adhesion and blush, as previously described.

B. Acetic Acid Solution

A 3% solution of acetic acid ($C_2H_4O_2$) in deionized water is prepared and heated to 100° C. Coated panels are immersed in the heated solution for 30 minutes and then removed, rinsed, and dried. Samples are then evaluated for adhesion and blush, as previously described.

C. Citric Acid Solution

A 2% solution of citric acid ($C_6H_8O_7$) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

8. Pot Life Stability

The pot life stability of a coating composition is measured by initially measuring its viscosity, and then storing the coating composition at 40° C. for one month. After the one-month period, the viscosity of the aged coating composition is measured and compared to the initial viscosity measurement. Substantially no change in viscosity (e.g., a change in viscosity, if any, of less than about 25%, more preferably less than about 15%, even more preferably less than about 10%, and even more preferably less than about 5%) indicates that the coating composition has a good pot life stability. In comparison, a significant increase in viscosity (e.g., gelation) indicates that the coating composition has poor pot life stability.

9. Glass Transition Temperature

Samples for differential scanning calorimetry ("DSC") testing may be prepared by first applying the liquid resin composition onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

10. Global Extraction

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure that can be used in the current invention is described in 21 CFR § 175.300 paragraph (e)(4)(xv) with the following modifications to ensure worst-case scenario performance: (1) the alcohol (ethanol) content is increased to 10% by weight, and (2) the filled containers are held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values are calculated based on surface area of the can (no end) of 44 square inches with a volume of 355 milliliters. Preferred coatings should give global extraction results of less than 50 ppm, more preferred results of less than 10 ppm, even more preferred results of less than 1 ppm. Most preferably, the global extraction results are optimally non-detectable.

In the following embodiment of the present application are summarized:

1. A method of forming a coating on a food or beverage container, the method comprising:
   receiving a coating composition having an emulsion-polymerized latex copolymer dispersed in an aqueous carrier, wherein the emulsion-polymerized latex polymer is a reaction product of monomers comprising:
   one or more first ethylenically-unsaturated monomers each having one or more ethylenically-unsaturated groups; and
   one or more styrene offset monomers comprising:
   (i) one or more ethylenically-unsaturated, polycyclic monomers;
   (ii) one or more ethylenically-unsaturated, monocyclic monomers each having a ring structure with 3-5 atoms in the ring; or
   combinations thereof, wherein a combined concentration of (i) and (ii) constitutes at least about 10% by weight of the monomers used to produce the emulsion-polymerized latex copolymer;
   wherein the monomers used to produce the emulsion-polymerized latex copolymer are substantially free of BPA, PVC, and styrene; and
   applying the coating composition to a substrate prior to or after forming the substrate into a food or beverage container, or a portion thereof.

2. The method of item 1, wherein applying the coating composition to the substrate comprises:
   spraying the provided coating composition onto an interior surface of the food or beverage container; and
   curing the sprayed coating composition to substantially remove the aqueous carrier, and provide the coating on the interior surface of the food or beverage container.

3. The method of item 2, wherein the coating composition has an average viscosity ranging from about 5 seconds to about 40 seconds, pursuant to the Viscosity Test.

4. The method of item 3, wherein the average viscosity of the coating composition ranges from about 15 seconds to about 25 seconds.

5. The method of any preceding item, wherein the coating composition has a resin solids content ranging from about 10% by weight to about 30% by weight, based on a total weight of the coating composition;

6. The method of any preceding item, wherein the one or more first ethylenically-unsaturated monomers are each substantially free of cyclic groups.

7. The method of any preceding item, wherein the one or more first ethylenically-unsaturated monomers comprise:
   one or more ethylenically-unsaturated, acid-functional monomers;
   one or more non-cyclic (meth)acrylates; or
   combinations thereof.

8. The method of item 7, wherein the one or more ethylenically-unsaturated, acid-functional monomers constitute at least 1% by weight of the emulsion-polymerized latex copolymer, based on the total weight of the monomers used to produce the emulsion-polymerized latex copolymer.

9. The method of item 8, wherein the one or more ethylenically-unsaturated, acid-functional monomers constitute at least 3% by weight of the emulsion-polymerized latex copolymer, based on the total weight of the monomers used to produce the emulsion-polymerized latex copolymer.

10. The method of item 9, wherein the concentration of the one or more ethylenically-unsaturated, acid-functional monomers ranges from 5% by weight to 20% by weight, based on the total weight of the monomers used to produce the emulsion-polymerized latex copolymer.

11. The method of any one of items 7-10, wherein the one or more non-cyclic (meth)acrylates have a concentration ranging from 10% by weight to 70% by weight, based on the total weight of the monomers used to produce the emulsion-polymerized latex copolymer.

12. The method of item 11, wherein the concentration of the one or more non-cyclic (meth)acrylates ranges from about 20% by weight to about 60% by weight, based on the total weight of the monomers used to produce the emulsion-polymerized latex copolymer.

13. The method of item 12, wherein the concentration of the one or more non-cyclic (meth)acrylates ranges from about 30% by weight to about 50% by weight, based on the total weight of the monomers used to produce the emulsion-polymerized latex copolymer.

14. The method of any one of items 7-13, wherein the one or more non-cyclic (meth)acrylates comprise a hydroxy-functional non-cyclic (meth)acrylate.

15. The method of any one of items 7-14, wherein the one or more first ethylenically-unsaturated monomers further comprise one or more polymerizable surfactants.

16. The method of any one of items 7-15, wherein the one or more first ethylenically-unsaturated monomers further comprise one or more multi-functional monomers.

17. The method of item 16, wherein the one or more multi-functional monomers comprises a monomer have two or more ethylenically-unsaturated groups.

18. The method of any one of items 1-17, wherein the combined concentration of (i) and (ii) constitutes at least 20% by weight of the monomers used to produce the emulsion-polymerized latex copolymer.

19. The method of item 18, wherein the combined concentration of (i) and (ii) constitutes at least 30% by weight of the monomers used to produce the emulsion-polymerized latex copolymer.

20. The method of any preceding item, wherein the one or more ethylenically-unsaturated, polycyclic monomers constitute at least 10% by weight of the monomers used to produce the emulsion-polymerized latex copolymer.

21. The method of item 20, wherein the one or more ethylenically-unsaturated, polycyclic monomers constitute at least 20% by weight of the monomers used to produce the emulsion-polymerized latex copolymer.

23. The method of item 21, wherein the one or more ethylenically-unsaturated, polycyclic monomers constitute at least 30% by weight of the monomers used to produce the emulsion-polymerized latex copolymer.

24. The method of any preceding item, wherein the one or more ethylenically-unsaturated, monocyclic monomers constitute at least 10% by weight of the monomers used to produce the emulsion-polymerized latex copolymer.

25. The method of item 24, wherein the one or more ethylenically-unsaturated, monocyclic monomers constitute at least 20% by weight of the monomers used to produce the emulsion-polymerized latex copolymer.

26. The method of item 25, wherein the one or more ethylenically-unsaturated, monocyclic monomers constitute at least 30% by weight of the monomers used to produce the emulsion-polymerized latex copolymer.

27. The method of any preceding item, and further comprising one or more ethylenically-unsaturated, monocyclic monomers each having a ring structure with 6 or more atoms in the ring.

28. The method of any preceding item, wherein the one or more ethylenically-unsaturated, polycyclic monomers are selected from the group consisting of isobornyl (meth)acrylate, norbornane (meth)acrylate, norbornene (meth)acrylate, norbornadiene, tricyclodecenyl (meth)acrylate, isosorbide (meth)acrylate, tricyclodecane (meth)acrylate, bicyclo[4.4.0]decane (meth)acrylate, vinyl variations thereof, and mixtures thereof.

29. The method of any preceding item, wherein the one or more ethylenically-unsaturated, polycyclic monomers comprise polycyclic groups that are derived from plant based materials.

30. The method of any preceding item, wherein the coating has a glass transition temperature greater than about 50° C.

31. The method of item 30, wherein the glass transition temperature of the coating ranges from about 60° C. to about 120° C.

32. The method of item 31, wherein the glass transition temperature of the coating ranges from about 80° C. to about 110° C.

33. The method of any preceding item, wherein the coating composition further includes a crosslinking agent.

34. The method of any preceding item, wherein the food or beverage container comprises a two-piece aluminum beverage can.

35. The method of any preceding item, wherein the coating composition exhibits substantially no change in viscosity pursuant to the Pot Life Stability test (e.g., a change in viscosity, if any, of less than about 25%, more preferably less than about 15%, even more preferably less than about 10%, and even more preferably less than about 5%).

36. The method of any preceding item, wherein the coating gives a global extraction of less than 10 parts-per-million, pursuant to the Global Extraction test.

37. The method of item 36, wherein the coating gives a global extraction of less than 1 part-per-million, pursuant to the Global Extraction test.

38. The method of any preceding item, wherein the coating composition is substantially free of halogenated compounds.

39. The method of any preceding item, wherein the coating composition is spray applied onto an interior surface of an aluminum beverage can including a body portion and a bottom end portion, and where the cured coating has a coating thickness ranging of from about 0.7 milligrams/square-inch (mg/inch$^2$) to about 2.5 mg/inch$^2$.

40. The method of any preceding item, wherein the monomers used to produce the emulsion-polymerized latex copolymer are substantially free of oxirane groups.

41. An article comprising a food or beverage container, or a portion thereof, including:
    a metal substrate; and
    an inside spray coating disposed on at least a portion of the metal substrate, wherein the coating is produced from an inside-spray coating composition having an emulsion-polymerized latex copolymer that is a reaction product of monomers comprising:
        one or more first ethylenically-unsaturated monomers each having one or more ethylenically-unsaturated groups; and
        one or more styrene offset monomers comprising:
            (i) one or more ethylenically-unsaturated, polycyclic monomers;
            (ii) one or more ethylenically-unsaturated, monocyclic monomers each having a ring structure with 3-5 atoms in the ring; or
            combinations thereof,
            wherein a combined concentration of (i) and (ii) constitutes at least about 10% by weight of the monomers used to produce the emulsion-polymerized latex copolymer;
        wherein the monomers used to produce the emulsion-polymerized latex copolymer are substantially free of BPA, PVC, halogenated monomer, and styrene.

42. The article of item 41, wherein the one or more one or more first ethylenically-unsaturated monomers comprise:
    one or more ethylenically-unsaturated, acid-functional monomers;
    one or more non-cyclic (meth)acrylates; or
    combinations thereof.

43. The article of item 42, wherein the one or more ethylenically-unsaturated, acid-functional monomers constitute at least 1% by weight of the emulsion-polymerized latex copolymer, based on the total weight of the monomers used to produce the emulsion-polymerized latex copolymer.

44. The article of item 43, wherein the one or more ethylenically-unsaturated, acid-functional monomers constitute at least 3% by weight of the emulsion-polymerized latex copolymer, based on the total weight of the monomers used to produce the emulsion-polymerized latex copolymer.

45. The article of item 44, wherein the concentration of the one or more ethylenically-unsaturated, acid-functional monomers ranges from 5% by weight to 20% by weight, based on the total weight of the monomers used to produce the emulsion-polymerized latex copolymer.

46. The article of any one of items 42-45, wherein the one or more non-cyclic (meth)acrylates have a concentration ranging from 10% by weight to 70% by weight, based on the total weight of the monomers used to produce the emulsion-polymerized latex copolymer.

47. The article of item 46, wherein the concentration of the one or more non-cyclic (meth)acrylates ranges from about 20% by weight to about 60% by weight, based on the total weight of the monomers used to produce the emulsion-polymerized latex copolymer.

48. The article of item 47, wherein the concentration of the one or more non-cyclic (meth)acrylates ranges from about 30% by weight to about 50% by weight, based on the total weight of the monomers used to produce the emulsion-polymerized latex copolymer.

49. The article of any one of items 42-48, wherein the one or more non-cyclic (meth)acrylates comprise a hydroxy-functional non-aromatic (meth)acrylate.

50. The article of any one of items 42-49, wherein the one or more first ethylenically-unsaturated monomers further comprise one or more polymerizable surfactants.

51. The article of any one of items 42-50, wherein the one or more first ethylenically-unsaturated monomers further comprise one or more multi-functional monomers.

52. The article of item 51, wherein the one or more multi-functional monomers comprises a monomer have two or more ethylenically-unsaturated groups.

53. The article of any one of items 41-52, wherein the combined concentration of (i) and (ii) constitutes at least 20% by weight of the monomers used to produce the emulsion-polymerized latex copolymer.

54. The article of item 53, wherein the combined concentration of (i) and (ii) constitutes at least 30% by weight of the monomers used to produce the emulsion-polymerized latex copolymer.

55. The article of any one of items 41-54, wherein the one or more ethylenically-unsaturated, polycyclic monomers constitute at least 10% by weight of the monomers used to produce the emulsion-polymerized latex copolymer.

56. The article of item 55, wherein the one or more ethylenically-unsaturated, polycyclic monomers constitute at least 20% by weight of the monomers used to produce the emulsion-polymerized latex copolymer.

57. The article of item 56, wherein the one or more ethylenically-unsaturated, polycyclic monomers constitute at least 30% by weight of the monomers used to produce the emulsion-polymerized latex copolymer.

58. The article of any one of items 41-57, wherein the one or more ethylenically-unsaturated, monocyclic monomers constitute at least 10% by weight of the monomers used to produce the emulsion-polymerized latex copolymer.

59. The article of item 58, wherein the one or more ethylenically-unsaturated, monocyclic monomers constitute at least 20% by weight of the monomers used to produce the emulsion-polymerized latex copolymer.

60. The article of item 59, wherein the one or more ethylenically-unsaturated, monocyclic monomers constitute at least 30% by weight of the monomers used to produce the emulsion-polymerized latex copolymer.

61. The article of any one of items 41-60, and further comprising one or more ethylenically-unsaturated, monocyclic monomers each having a ring structure with 6 or more atoms in the ring.

62. The article of any one of items 41-61, wherein the coating has a glass transition temperature greater than about 50° C.

63. The article of item 62, wherein the glass transition temperature of the coating ranges from about 60° C. to about 120° C.

64. The article of item 63, wherein the glass transition temperature of the coating ranges from about 80° C. to about 110° C.

65. The article of any one of items 41-64, wherein the coating composition further includes a crosslinking agent.

66. The article of any one of items 41-65, wherein the coating composition is substantially free of halogenated compounds.

67. The article of any one of items 41-66, wherein the cured coating has a coating thickness ranging of from about 0.7 milligrams/square-inch (mg/inch$^2$) to about 2.5 mg/inch$^2$.

68. The article of any one of items 41-67, wherein the one or more ethylenically-unsaturated, polycyclic monomers are selected from the group consisting of isobornyl (meth) acrylate), norbornane (meth)acrylate, norbornene (meth) acrylate, norbornadiene, tricyclodecenyl (meth)acrylate, isosorbide (metha)acrylate, tricyclodecane (meth)acrylate, bicyclo[4.4.0]decane (meth)acrylate, vinyl variations thereof, and mixtures thereof.

69. The article of any one of items 41-67, wherein the one or more ethylenically-unsaturated, polycyclic monomers comprise polycyclic groups that are derived from plant based materials.

70. The article of any one of items 41-69, wherein the monomers used to produce the emulsion-polymerized latex copolymer are substantially free of oxirane groups.

71. The article of any one of items 41-69, wherein the monomers used to produce the emulsion-polymerized latex copolymer are substantially free of glycidyl methacrylate and glycidyl acrylate.

72. An inside spray coating composition comprising:
  an aqueous carrier; and
  an emulsion-polymerized latex copolymer dispersed in the aqueous carrier, and comprising:
    one or more ethylenically-unsaturated monomers each having one or more ethylenically-unsaturated groups; and
    one or more styrene offset monomers comprising:
      (i) one or more ethylenically-unsaturated, polycyclic monomers;
      (ii) one or more ethylenically-unsaturated, monocyclic monomers each having a ring structure with 3-5 atoms in the ring; or combinations thereof,
      wherein a combined concentration of (i) and (ii) constitutes at least about 10% by weight of the monomers used to produce the emulsion-polymerized latex copolymer;
    wherein the monomers used to produce the emulsion-polymerized latex copolymer are substantially free of BPA, PVC, halogenated monomers, and styrene;
  wherein the coating composition has an average viscosity ranging from about 5 seconds to about 40 seconds, pursuant to the Viscosity Test; and
  wherein the coating composition has a resin solids content ranging from about 10% by weight to about 30% by weight, based on a total weight of the coating composition.

73. The coating composition of item 72, wherein the average viscosity of the coating composition ranges from about 15 seconds to about 25 seconds.

74. The coating composition of any one of items 72-73, wherein the one or more ethylenically-unsaturated monomers comprise:
   one or more ethylenically-unsaturated, acid-functional monomers;
   one or more non-cyclic (meth)acrylates; or
   combinations thereof.

75. The coating composition of item 74, wherein the one or more ethylenically-unsaturated, acid-functional monomers constitute at least 1% by weight of the emulsion-polymerized latex copolymer, based on the total weight of the monomers used to produce the emulsion-polymerized latex copolymer.

76. The coating composition of item 75, wherein the one or more ethylenically-unsaturated, acid-functional monomers constitute at least 3% by weight of the emulsion-polymerized latex copolymer, based on the total weight of the monomers used to produce the emulsion-polymerized latex copolymer.

77. The coating composition of item 76, wherein the concentration of the one or more ethylenically-unsaturated, acid-functional monomers ranges from 5% by weight to 20% by weight, based on the total weight of the monomers used to produce the emulsion-polymerized latex copolymer.

78. The coating composition of any one of items 74-77, wherein the one or more non-cyclic (meth)acrylates have a concentration ranging from 10% by weight to 70% by weight, based on the total weight of the monomers used to produce the emulsion-polymerized latex copolymer.

79. The coating composition of item 78, wherein the concentration of the one or more non-cyclic (meth)acrylates ranges from about 20% by weight to about 60% by weight, based on the total weight of the monomers used to produce the emulsion-polymerized latex copolymer.

80. The coating composition of item 79, wherein the concentration of the one or more non-cyclic (meth)acrylates ranges from about 30% by weight to about 50% by weight, based on the total weight of the monomers used to produce the emulsion-polymerized latex copolymer.

81. The coating composition of any one of items 74-80, wherein the one or more non-cyclic (meth)acrylates comprise a hydroxy-functional non-cyclic (meth)acrylate.

82. The coating composition of any one of items 74-81, wherein the one or more first ethylenically-unsaturated monomers further comprise one or more polymerizable surfactants.

83. The coating composition of any one of items 74-82, wherein the one or more first ethylenically-unsaturated monomers further comprise one or more multi-functional monomers.

84. The coating composition of item 83, wherein the one or more multi-functional monomers comprises a monomer have two or more ethylenically-unsaturated groups.

85. The coating composition of any one of items 72-84, wherein the combined concentration of (i) and (ii) constitutes at least 20% by weight of the monomers used to produce the emulsion-polymerized latex copolymer.

86. The coating composition of item 85, wherein the combined concentration of (i) and (ii) constitutes at least 30% by weight of the monomers used to produce the emulsion-polymerized latex copolymer.

87. The coating composition of any one of items 72-86, wherein the one or more ethylenically-unsaturated, polycyclic monomers constitute at least 10% by weight of the monomers used to produce the emulsion-polymerized latex copolymer.

88. The coating composition of item 87, wherein the one or more ethylenically-unsaturated, polycyclic monomers constitute at least 20% by weight of the monomers used to produce the emulsion-polymerized latex copolymer.

89. The coating composition of item 88, wherein the one or more ethylenically-unsaturated, polycyclic monomers constitute at least 30% by weight of the monomers used to produce the emulsion-polymerized latex copolymer.

90. The coating composition of any one of items 72-89, wherein the one or more ethylenically-unsaturated, monocyclic monomers constitute at least 10% by weight of the monomers used to produce the emulsion-polymerized latex copolymer.

91. The coating composition of item 90, wherein the one or more ethylenically-unsaturated, monocyclic monomers constitute at least 20% by weight of the monomers used to produce the emulsion-polymerized latex copolymer.

92. The coating composition of item 91, wherein the one or more ethylenically-unsaturated, monocyclic monomers constitute at least 30% by weight of the monomers used to produce the emulsion-polymerized latex copolymer.

93. The coating composition of any one of items 72-92, and further comprising one or more ethylenically-unsaturated, monocyclic monomers each having a ring structure with 6 or more atoms in the ring.

94. The coating composition of any one of items 72-93, wherein the one or more ethylenically-unsaturated, polycyclic monomers are selected from the group consisting of isobornyl (meth)acrylate), norbornane (meth)acrylate, norbornene (meth)acrylate, norbornadiene, tricyclodecenyl (meth)acrylate, isosorbide (metha)crylate, tricyclodecane (meth)acrylate, bicyclo[4.4.0]decane (meth)acrylate, vinyl variations thereof, and mixtures thereof.

95. The coating composition of any one of items 72-93, wherein the one or more ethylenically-unsaturated, polycyclic monomers comprise polycyclic groups that are derived from plant based materials.

96. The coating composition of any one of items 72-95, wherein the coating composition further includes a cross-linking agent.

97. The coating composition of any one of items 72-96, wherein the coating composition exhibits substantially no change in viscosity pursuant to the Pot Life Stability test (e.g., a change in viscosity, if any, of less than about 25%, more preferably less than about 15%, even more preferably less than about 10%, and even more preferably less than about 5%).

98. The coating composition of any one of items 72-97, wherein the coating composition is substantially free of halogenated compounds.

99. The coating composition of any one of items 72-98, wherein the monomers used to produce the emulsion-polymerized latex copolymer are substantially free of oxirane groups.

EXAMPLES

The present disclosure is more particularly described in the following examples that are intended as illustrations only, since numerous modifications and variations within the scope of the present disclosure will be apparent to those skilled in the art.

Coating Composition CC1

A coating composition CC1 was prepared using a two-stage polymerization process. For the first-stage polymerization, deionized water, a polymerizable surfactant monomer, and an organic acid catalyst were added to a reactor, which was then heated under nitrogen sparge to 80° C. with agitation. Once equilibrium temperature was reached, an initiator solution and the first-stage monomers were introduced to the surfactant dispersion in the reactor continuously over a 75-minute duration while the reactor was maintained under nitrogen sparge at the temperature of 80° C. with agitation.

The initiator solution included ammonium persulphate and deionized water. The first-stage monomers are listed below in Table 1, and included an aromatic methacrylate instead of styrene. After all of the initiator solution and the first-stage monomers were added, the reactor was held at the temperature of 80° C. under agitation for an additional 30 minutes to complete the first-stage emulsion polymerization, thereby producing an in situ latex emulsion having the first-stage copolymers. These first-stage copolymers included chain segments of the polymerizable surfactant monomer, and carboxylic acid groups.

A portion of the carboxylic acid groups of the resulting first-stage copolymers was then neutralized for water-dispersibility purposes. This included introducing dimethylethanol amine (DMEA) and deionized water over a period of 60 minutes. After neutralization, an inhibitor solution of phenothiazine and butyl glycol was added to the reactor to inhibit further polymerization. The in situ latex emulsion was agitated at the temperature of 80° C. for an additional five minutes.

Glycidyl methacrylate was then introduced to the reactor to react with some of the remaining carboxylic acid groups of the first-stage copolymers using a step-growth reaction. After the glycidyl methacrylate was introduced, the reactor was agitated at the temperature of 80° C. for three hours to complete the step-growth reaction. During the step-growth reaction, the oxirane groups of the glycidyl methacrylate reacted with the carboxylic acid groups of the first-stage copolymers to graft the glycidyl methacrylate chains to the first-stage copolymers via ester linkages. This produced linkage groups characterized as pendant ester segments with terminated with vinyl groups.

After the linkage group grafting step was completed, a redox solution was introduced to the reactor, which included ferrous sulphate heptahydrate, tertioamyl hydroperoxide, and deionized water. Then a second initiator solution and the second-stage monomers were introduced to the reactor continuously over a 75-minute duration while the reactor was maintained under nitrogen sparge at the temperature of 80° C. with agitation.

The second initiator solution included isoascorbic acid, dimethylethanol amine (DMEA), and deionized water. The second-stage monomers are also listed below in Table 1, and included polycyclic methacrylate instead of styrene. During the second-stage polymerization, after all of the second initiator solution and the second-stage monomers were added, the reactor was held at the temperature of 80° C. under agitation for an additional 45 minutes.

Then a spike of the initiator and redox solutions was added to reduce the level of free monomers. The spike included 0.001 parts of ferrous sulphate heptahydrate, 0.3 parts of tertioamyl hydroperoxide, 0.2 parts of isoascorbic acid, 0.12 parts of DMEA, and 10 parts of deionized water. The reactor was maintained under nitrogen sparge at the temperature of 80° C. with agitation for an additional two hours to complete the second-stage emulsion polymerization, thereby producing a latex emulsion of the present disclosure.

After the second-stage polymerization was completed, the reactor was slowly cooled down to 40° C. and filtered to collect the resulting latex emulsion, where no coagulum was visibly observable. The resulting latex emulsion had a total solids content of 33.0% by weight. The resulting latex emulsion copolymers included monomer concentrations as listed below in Table 1.

TABLE 1

| First-Stage Monomers and Linkage Monomers | Percent by weight |
|---|---|
| Polyermizable Surfactant (Reasoap SR1025) | 2.8 |
| Benzyl Methacrylate | 52.8 |
| Methacrylic Acid | 19.4 |
| Isobornyl Acrylate | 17.6 |
| Hydroxyethyl Methacrylate (HEMA) | 3.5 |
| Glycidyl Methacrylate (GMA)-Linkage Monomers | 3.9 |

| Second-Stage Monomers | Percent by weight |
|---|---|
| Benzyl Methacrylate | 44.8 |
| Glycidyl Methacrylate (GMA) | 18.3 |
| Ethyl Acrylate | 17.4 |
| Isobornyl Acrylate | 14.9 |
| Hydroxyethyl Methacrylate (HEMA) | 4.6 |

| Total Monomers | Percent by weight |
|---|---|
| First-Stage Monomers | 51.1 |
| Linkage Monomers | 2.1 |
| Second-Stage Monomers | 46.8 |

The resulting latex emulsion was then diluted with a solution of deionized water and organic solvents to reach a viscosity between 15 and 25 seconds based on the Viscosity Test. This resulted in the coating composition CC1, which did not include any external crosslinker.

The complete disclosures of the patents, patent documents, and publications cited herein are incorporated by reference to the extent that they do not conflict with the present disclosure. Although the present disclosure has been described with reference to preferred embodiments, workers skilled in the art will recognize that changes may be made in form and detail without departing from the spirit and scope of the disclosure.

The invention claimed is:

1. An inside spray food or beverage container coating composition comprising:
   an aqueous carrier; and
   an emulsion-polymerized latex copolymer dispersed in the aqueous carrier, wherein the monomers used to produce the emulsion-polymerized latex copolymer (i) include one or more polymerizable surfactants and (ii) are substantially free of BPA, PVC, halogenated monomers, and styrene;
   wherein the coating composition has an average viscosity ranging from about 5 seconds to about 40 seconds, pursuant to the Viscosity Test;
   wherein the coating composition has a resin solids content ranging from about 10% by weight to about 30% by weight, based on a total weight of the coating composition; and
   wherein the coating composition, when cured, has a glass transition temperature of 50° C. or greater.

2. The inside spray coating composition of claim 1, wherein the coating composition, when cured, has a glass transition temperature of 60° C. or greater.

3. The inside spray coating composition of claim 1, wherein the coating composition, when cured, has a glass transition temperature of 70° C. or greater.

4. The inside spray coating composition of claim 1, wherein the coating composition, when cured, has a glass transition temperature of 80° C. or more.

5. The inside spray coating composition of claim 1, wherein the one or more polymerizable surfactants constitutes 1% or more by weight of the emulsion-polymerized latex copolymer, based on the entire weight of the reactant monomers used to produce the emulsion-polymerized latex copolymer.

6. The inside spray coating composition of claim 3, wherein the one or more polymerizable surfactants constitutes 2% or more by weight of the emulsion-polymerized latex copolymer, based on the entire weight of the reactant monomers used to produce the emulsion-polymerized latex copolymer.

7. The inside spray coating composition of claim 1, wherein the one or more polymerizable surfactants constitutes 1% or more by weight of the emulsion-polymerized latex copolymer, based on the entire weight of the reactant monomers used to produce the emulsion-polymerized latex copolymer.

8. The inside spray coating composition of claim 1, wherein the one or more polymerizable surfactants constitutes 25% or less by weight of the emulsion-polymerized latex copolymer, based on the entire weight of the reactant monomers used to produce the emulsion-polymerized latex copolymer.

9. The inside spray coating composition of claim 5, wherein the one or more polymerizable surfactants constitutes 10% or less by weight of the emulsion-polymerized latex copolymer, based on the entire weight of the reactant monomers used to produce the emulsion-polymerized latex copolymer.

10. The inside spray coating composition of claim 1, wherein the one or more polymerizable surfactants are polymerized or otherwise reacted under free radical-initiated polymerization conditions.

11. The inside spray coating composition of claim 5, wherein the one or more polymerizable surfactants include an ethylenically-unsaturated group.

12. The inside spray coating composition of claim 1, wherein the monomers used to produce the emulsion-polymerized latex copolymer include one or more multi-ethylenically unsaturated monomer.

13. The inside spray coating composition of claim 12, wherein the one or more multi-ethylenically unsaturated monomers constitute 5% or more by weight of the emulsion-polymerized latex copolymer, based on the entire weight of the reactant monomers used to produce the emulsion-polymerized latex copolymer.

14. The inside spray coating composition of claim 13, wherein the monomers used to produce the emulsion-polymerized latex copolymer are substantially free of oxirane groups.

15. The inside spray coating composition of claim 12, wherein the one or more multi-ethylenically unsaturated monomer constitutes from 8% to 25% by weight of the emulsion-polymerized latex copolymer, based on the entire weight of the reactant monomers used to produce the emulsion-polymerized latex copolymer.

16. The inside spray coating composition of claim 1, wherein the emulsion-polymerized latex copolymer is a multiple stage latex.

17. The inside spray coating composition of claim 1, wherein the aqueous carrier includes from about 5% to about 50% of organic solvent, based on the total weight of the aqueous carrier.

18. The inside spray coating composition of claim 7, wherein the aqueous carrier includes from about 10% to about 40% of organic solvent, based on the total weight of the aqueous carrier.

19. The inside spray coating composition of claim 1, wherein the coating composition is substantially free of formaldehyde and formaldehyde-containing materials.

20. An inside spray beverage container coating composition comprising:
an aqueous carrier that includes from 5% to 50% of organic solvent, based on the total weight of the aqueous carrier; and
an emulsion-polymerized latex copolymer dispersed in the aqueous carrier, wherein the monomers used to produce the emulsion-polymerized latex copolymer (i) include one or more polymerizable surfactants having an ethylenically-unsaturated group and (ii) are substantially free of BPA, PVC, halogenated monomers, and styrene;
wherein the coating composition has an average viscosity ranging from about 5 seconds to about 40 seconds, pursuant to the Viscosity Test;
wherein the coating composition has a resin solids content ranging from about 10% by weight to about 30% by weight, based on a total weight of the coating composition;
wherein the coating composition, when cured, has a glass transition temperature of from about 60° C. to about 120° C.

21. The inside spray coating composition of claim 20, wherein the monomers used to produce the emulsion-polymerized latex copolymer include one or more multi-ethylenically unsaturated monomer, and wherein the one or more multi-ethylenically unsaturated monomers constitute 5% or more by weight of the emulsion-polymerized latex copolymer, based on the entire weight of the reactant monomers used to produce the emulsion-polymerized latex copolymer.

* * * * *